US012262174B2

(12) United States Patent
Abraham et al.

(10) Patent No.: US 12,262,174 B2
(45) **Date of Patent: *Mar. 25, 2025**

(54) ARRAY MICROPHONE SYSTEM AND METHOD OF ASSEMBLING THE SAME

(71) Applicant: Shure Acquisition Holdings, Inc., Niles, IL (US)

(72) Inventors: Mathew T. Abraham, Colorado Springs, CO (US); David Grant Cason, Palatine, IL (US); John Casey Gibbs, Chicago, IL (US); Gregory William Lantz, Geneva, IL (US); Albert Francis McGovern, Jr., Naperville, IL (US); Brent Robert Shumard, Mount Prospect, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,675

(22) Filed: Oct. 12, 2023

(65) Prior Publication Data

US 2024/0187786 A1 Jun. 6, 2024

Related U.S. Application Data

(63) Continuation of application No. 17/656,929, filed on Mar. 29, 2022, now Pat. No. 11,832,053, which is a (Continued)

(51) Int. Cl.

*H04R 1/02* (2006.01)
*H04R 1/40* (2006.01)
*H04R 31/00* (2006.01)

(52) U.S. Cl.

CPC ............... *H04R 1/406* (2013.01); *H04R 1/02* (2013.01); *H04R 31/00* (2013.01);

(Continued)

(58) Field of Classification Search

CPC ....... G01S 3/805; G01S 15/42; G10K 11/346; G10L 21/0208; G10L 21/0232;

(Continued)

(56) References Cited

U.S. PATENT DOCUMENTS 1,535,408 A 4/1925 Fricke
1,540,788 A 6/1925 McClure (Continued)

FOREIGN PATENT DOCUMENTS

AU 2004200802 3/2004
BE 775247 3/1972

(Continued)

OTHER PUBLICATIONS

Double Condenser Microphone SM 69, Datasheet, Georg Neumann GmbH, available at <https://ende.neumann.com/product_files/7453/download>, 8 pp.

(Continued)

*Primary Examiner* — Gerald Gauthier
(74) *Attorney, Agent, or Firm* — Neal, Gerber & Eisenberg LLP

(57) ABSTRACT

Embodiments include a microphone assembly comprising an array microphone and a housing configured to support the array microphone and sized and shaped to be mountable in a drop ceiling in place of at least one of a plurality of ceiling tiles included in the drop ceiling. A front face of the housing includes a sound-permeable screen having a size and shape that is substantially similar to the at least one of the plurality of ceiling tiles. Embodiments also include an array microphone system comprising a plurality of microphones arranged, on a substrate, in a number of concentric, nested rings of varying sizes around a central point of the substrate.

(Continued)

Each ring comprises a subset of the plurality of microphones positioned at predetermined intervals along a circumference of the ring.

18 Claims, 11 Drawing Sheets

Related U.S. Application Data continuation of application No. 16/598,918, filed on Oct. 10, 2019, now Pat. No. 11,310,592, which is a continuation of application No. 15/833,404, filed on Dec. 6, 2017, now abandoned, which is a continuation of application No. 15/631,310, filed on Jun. 23, 2017, now abandoned, which is a continuation of application No. 15/403,765, filed on Jan. 11, 2017, now abandoned, which is a continuation of application No. 14/701,376, filed on Apr. 30, 2015, now Pat. No. 9,565,493.

(52) U.S. Cl.
CPC .... *H04R 2201/021* (2013.01); *H04R 2201/40* (2013.01); *H04R 2201/401* (2013.01); *H04R 2201/405* (2013.01)

(58) Field of Classification Search
CPC .............. G10L 21/0364; H04N 13/204; H04N 23/611; H04R 1/02; H04R 1/288; H04R 1/403; H04R 1/406; H04R 3/005; H04R 31/00; H04R 2201/021; H04R 2201/40; H04R 2201/401; H04R 2201/405; H04R 1/025; H04R 5/02; H04R 31/006; A47G 1/0616; B41J 2/1628; G01H 11/06; G01L 9/0042
See application file for complete search history.

(56) References Cited

U.S. PATENT DOCUMENTS

| | | | | | |
|---|---|---|---|---|---|
| 1,965,830 | A | | 7/1934 | Hammer | |
| 2,075,588 | A | | 3/1937 | Meyers | |
| 2,113,219 | A | | 4/1938 | Olson | |
| 2,164,655 | A | | 7/1939 | Kleerup | |
| D122,771 | S | | 10/1940 | Doner | |
| 2,233,412 | A | | 3/1941 | Hill | |
| 2,268,529 | A | | 12/1941 | Stiles | |
| 2,343,037 | A | | 2/1944 | Adelman | |
| 2,377,449 | A | | 6/1945 | Prevette | |
| 2,481,250 | A | | 9/1949 | Schneider | |
| 2,521,603 | A | | 9/1950 | Prew | |
| 2,533,565 | A | | 12/1950 | Eichelman | |
| 2,539,671 | A | | 1/1951 | Olson | |
| 2,777,232 | A | | 1/1957 | Kulicke | |
| 2,828,508 | A | | 4/1958 | Labarre | |
| 2,840,181 | A | | 6/1958 | Wildman | |
| 2,882,633 | A | | 4/1959 | Howell | |
| 2,912,605 | A | | 11/1959 | Tibbetts | |
| 2,938,113 | A | | 5/1960 | Schnell | |
| 2,950,556 | A | | 8/1960 | Larios | |
| 3,019,854 | A | | 2/1962 | Obryant | |
| 3,132,713 | A | | 5/1964 | Seeler | |
| 3,143,182 | A | | 8/1964 | Sears | |
| 3,160,225 | A | | 12/1964 | Sechrist | |
| 3,161,975 | A | | 12/1964 | McMillan | |
| 3,205,601 | A | | 9/1965 | Gawne | |
| 3,239,973 | A | | 3/1966 | Hannes | |
| 3,240,883 | A | | 3/1966 | Seeler | |
| 3,310,901 | A | | 3/1967 | Sarkisian | |
| 3,321,170 | A | | 5/1967 | Vye | |
| 3,509,290 | A | | 4/1970 | Mochida | |
| 3,573,399 | A | | 4/1971 | Schroeder | |
| 3,657,490 | A | | 4/1972 | Scheiber | |
| 3,696,885 | A | | 10/1972 | Grieg | |
| 3,699,271 | A | | 10/1972 | Berkley | |
| 3,755,625 | A | | 8/1973 | Maston | |
| 3,828,508 | A | | 8/1974 | Moeller | |
| 3,857,191 | A | | 12/1974 | Sadorus | |
| 3,895,194 | A | | 7/1975 | Fraim | |
| 3,906,431 | A | | 9/1975 | Clearwaters | |
| D237,103 | S | | 10/1975 | Fisher | |
| 3,936,606 | A | | 2/1976 | Wanke | |
| 3,938,617 | A | | 2/1976 | Forbes | |
| 3,941,638 | A | | 3/1976 | Horky | |
| 3,992,584 | A | | 11/1976 | Dugan | |
| 4,007,461 | A | | 2/1977 | Luedtke | |
| 4,008,408 | A | | 2/1977 | Kodama | |
| 4,029,170 | A | * | 6/1977 | Phillips | H04R 1/20<br>181/160 |
| 4,032,725 | A | | 6/1977 | McGee | |
| 4,070,547 | A | | 1/1978 | Dellar | |
| 4,072,821 | A | | 2/1978 | Bauer | |
| 4,096,353 | A | | 6/1978 | Bauer | |
| 4,127,156 | A | | 11/1978 | Brandt | |
| 4,131,760 | A | | 12/1978 | Christensen | |
| 4,169,219 | A | | 9/1979 | Beard | |
| 4,184,048 | A | | 1/1980 | Alcaide | |
| 4,198,705 | A | | 4/1980 | Massa | |
| D255,234 | S | | 6/1980 | Wellward | |
| D256,015 | S | | 7/1980 | Doherty | |
| 4,212,133 | A | | 7/1980 | Lufkin | |
| 4,237,339 | A | | 12/1980 | Bunting | |
| 4,244,096 | A | | 1/1981 | Kashichi | |
| 4,244,906 | A | | 1/1981 | Heinemann | |
| 4,254,417 | A | | 3/1981 | Speiser | |
| 4,275,694 | A | | 6/1981 | Nagaishi | |
| 4,296,280 | A | | 10/1981 | Richie | |
| 4,305,141 | A | | 12/1981 | Massa | |
| 4,308,425 | A | | 12/1981 | Momose | |
| 4,311,874 | A | | 1/1982 | Wallace, Jr. | |
| 4,330,691 | A | | 5/1982 | Gordon | |
| 4,334,740 | A | | 6/1982 | Wray | |
| 4,365,449 | A | | 12/1982 | Liautaud | |
| 4,373,191 | A | | 2/1983 | Fette | |
| 4,393,631 | A | | 7/1983 | Krent | |
| 4,414,433 | A | | 11/1983 | Horie | |
| 4,429,850 | A | | 2/1984 | Weber | |
| 4,436,966 | A | * | 3/1984 | Botros | H04R 1/406<br>381/357 |
| 4,449,238 | A | | 5/1984 | Lee | |
| 4,466,117 | A | | 8/1984 | Goerike | |
| 4,485,484 | A | | 11/1984 | Flanagan | |
| 4,489,442 | A | | 12/1984 | Anderson | |
| 4,518,826 | A | | 5/1985 | Caudill | |
| 4,521,908 | A | | 6/1985 | Miyaji | |
| 4,559,642 | A | * | 12/1985 | Miyaji | G10K 11/346<br>345/157 |
| 4,566,557 | A | | 1/1986 | Lemaitre | |
| 4,593,404 | A | | 6/1986 | Bolin | |
| 4,594,478 | A | | 6/1986 | Gumb | |
| D285,067 | S | | 8/1986 | Delbuck | |
| 4,625,827 | A | | 12/1986 | Bartlett | |
| 4,653,102 | A | | 3/1987 | Hansen | |
| 4,658,425 | A | | 4/1987 | Julstrom | |
| 4,669,108 | A | | 5/1987 | Deinzer | |
| 4,675,906 | A | | 6/1987 | Sessler | |
| 4,693,174 | A | | 9/1987 | Anderson | |
| 4,696,043 | A | | 9/1987 | Iwahara | |
| 4,712,231 | A | | 12/1987 | Julstrom | |
| 4,741,038 | A | | 4/1988 | Elko | |
| 4,752,961 | A | | 6/1988 | Kahn | |
| 4,768,086 | A | | 8/1988 | Paist | |
| 4,805,730 | A | | 2/1989 | O'Neill | |
| 4,815,132 | A | | 3/1989 | Minami | |
| 4,860,366 | A | | 8/1989 | Fukushi | |
| 4,862,507 | A | | 8/1989 | Woodard | |
| 4,866,868 | A | | 9/1989 | Kass | |
| 4,881,135 | A | | 11/1989 | Heilweil | |
| 4,888,807 | A | | 12/1989 | Reichel | |
| 4,903,247 | A | | 2/1990 | Van Gerwen | |

(56) References Cited

U.S. PATENT DOCUMENTS 4,923,032 A * 5/1990 Nuernberger .......... H04R 1/025 381/124
4,928,312 A 5/1990 Hill
4,969,197 A 11/1990 Takaya
5,000,286 A 3/1991 Crawford
5,038,935 A 8/1991 Wenkman
5,058,170 A 10/1991 Kanamori
5,088,574 A 2/1992 Kertesz, III
D324,780 S 3/1992 Sebesta
5,121,426 A 6/1992 Baumhauer
D329,239 S 9/1992 Hahn
5,189,701 A 2/1993 Jain
5,204,907 A 4/1993 Staple
5,214,709 A 5/1993 Ribic
5,224,170 A 6/1993 Waite, Jr.
D340,718 S 10/1993 Leger
5,289,544 A 2/1994 Franklin
D345,346 S 3/1994 Alfonso
D345,379 S 3/1994 Chan
5,297,210 A 3/1994 Julstrom
5,322,979 A 6/1994 Cassity
5,323,459 A 6/1994 Hirano
5,329,593 A 7/1994 Lazzeroni
5,335,011 A 8/1994 Addeo
5,353,279 A 10/1994 Koyama
5,359,374 A * 10/1994 Schwartz ............. A47G 1/0616 40/717
5,371,789 A 12/1994 Hirano
5,383,293 A 1/1995 Royal
5,384,843 A 1/1995 Masuda
5,396,554 A 3/1995 Hirano
5,400,413 A 3/1995 Kindel
D363,045 S 10/1995 Phillips
5,473,701 A 12/1995 Cezanne
5,509,634 A 4/1996 Gebka
5,513,265 A 4/1996 Hirano
5,525,765 A 6/1996 Freiheit
5,550,924 A 8/1996 Helf
5,550,925 A 8/1996 Hori
5,555,447 A 9/1996 Kotzin
5,574,793 A 11/1996 Hirschhorn
5,602,962 A 2/1997 Kellermann
5,612,929 A 3/1997 Lopes
5,633,936 A 5/1997 Oh
5,645,257 A 7/1997 Ward
D382,118 S 8/1997 Ferrero
5,657,393 A 8/1997 Crow
5,661,813 A 8/1997 Shimauchi
5,673,327 A 9/1997 Julstrom
5,687,229 A 11/1997 Sih
5,706,344 A 1/1998 Finn
5,715,319 A 2/1998 Chu
5,717,171 A 2/1998 Miller
D392,977 S 3/1998 Kim
D394,061 S 5/1998 Fink
5,761,318 A 6/1998 Shimauchi
5,766,702 A 6/1998 Lin
5,787,183 A 7/1998 Chu
5,796,819 A 8/1998 Romesburg
5,848,146 A 12/1998 Slattery
5,870,482 A * 2/1999 Loeppert ................ G01H 11/06 381/174
5,878,147 A 3/1999 Killion
5,888,412 A * 3/1999 Sooriakumar ........ G01L 9/0042 216/2
5,888,439 A 3/1999 Miller
D416,315 S 11/1999 Nanjo
5,978,211 A 11/1999 Hong
5,991,277 A 11/1999 Maeng
6,035,962 A 3/2000 Lin
6,039,457 A 3/2000 O'Neal
6,041,127 A 3/2000 Elko
6,049,607 A 4/2000 Marash
D424,538 S 5/2000 Hayashi
6,069,961 A 5/2000 Nakazawa
6,125,179 A 9/2000 Wu
D432,518 S 10/2000 Muto
6,128,395 A 10/2000 De Vries
6,137,887 A 10/2000 Anderson
6,144,746 A 11/2000 Azima
6,151,399 A 11/2000 Killion
6,173,059 B1 * 1/2001 Huang ................... H04R 1/406 379/202.01
6,198,831 B1 3/2001 Azima
6,205,224 B1 * 3/2001 Underbrink ............ H04R 1/403 343/893
6,215,881 B1 4/2001 Azima
6,266,427 B1 7/2001 Mathur
6,285,770 B1 9/2001 Azima
6,301,357 B1 10/2001 Romesburg
6,329,908 B1 12/2001 Frecska
6,332,029 B1 12/2001 Azima
D453,016 S 1/2002 Nevill
6,386,315 B1 5/2002 Roy
6,393,129 B1 5/2002 Conrad
6,424,635 B1 7/2002 Song
6,442,272 B1 8/2002 Osovets
6,449,593 B1 9/2002 Valve
6,481,173 B1 11/2002 Roy
6,488,367 B1 * 12/2002 Debesis ................. B41J 2/1628 347/70
D469,090 S 1/2003 Tsuji
6,505,057 B1 1/2003 Finn
6,507,659 B1 1/2003 Iredale
6,510,919 B1 * 1/2003 Roy ......................... H04R 1/02 181/173
6,526,147 B1 2/2003 Rung
6,556,682 B1 4/2003 Gilloire
6,592,237 B1 7/2003 Pledger
6,622,030 B1 9/2003 Romesburg
D480,923 S 10/2003 Neubourg
6,633,647 B1 10/2003 Markow
6,665,971 B2 12/2003 Lowry
6,694,028 B1 2/2004 Matsuo
6,704,422 B1 3/2004 Jensen
D489,707 S 5/2004 Kobayashi
6,731,334 B1 5/2004 Maeng
6,741,720 B1 5/2004 Myatt
6,757,393 B1 * 6/2004 Spitzer ..................... H04R 5/02 40/717
6,768,795 B2 7/2004 Feltstroem
6,868,377 B1 3/2005 Laroche
6,885,750 B2 4/2005 Egelmeers
6,885,986 B1 4/2005 Gigi
D504,889 S 5/2005 Andre
6,889,183 B1 5/2005 Gunduzhan
6,895,093 B1 5/2005 Ali
6,931,123 B1 8/2005 Hughes
6,944,312 B2 9/2005 Mason
D510,729 S 10/2005 Chen
6,968,064 B1 11/2005 Ning
6,990,193 B2 1/2006 Beaucoup
6,993,126 B1 1/2006 Kyrylenko
6,993,145 B2 1/2006 Combest
7,003,099 B1 2/2006 Zhang
7,013,267 B1 3/2006 Huart
7,031,269 B2 4/2006 Lee
7,035,398 B2 4/2006 Matsuo
7,035,415 B2 4/2006 Belt
7,050,576 B2 5/2006 Zhang
7,054,451 B2 5/2006 Janse
D526,643 S 8/2006 Ishizaki
D527,372 S 8/2006 Allen
7,092,516 B2 8/2006 Furuta
7,092,539 B2 * 8/2006 Sheplak ................. H04R 3/005 257/528
7,092,882 B2 8/2006 Arrowood
7,098,865 B2 8/2006 Christensen
7,106,876 B2 9/2006 Santiago
7,120,269 B2 10/2006 Lowell
7,130,309 B2 10/2006 Boaz
D533,177 S 12/2006 Andre
7,149,320 B2 12/2006 Haykin
7,161,534 B2 1/2007 Tsai

(56) References Cited

U.S. PATENT DOCUMENTS

| | | | | |
|---|---|---|---|---|
| 7,187,765 | B2 | 3/2007 | Popovic | |
| 7,203,308 | B2 | 4/2007 | Kubota | |
| D542,543 | S | 5/2007 | Bruce | |
| 7,212,628 | B2 | 5/2007 | Popovic | |
| D546,318 | S | 7/2007 | Yoon | |
| D546,814 | S | 7/2007 | Takita | |
| D547,748 | S | 7/2007 | Tsuge | |
| 7,239,714 | B2 | 7/2007 | De Blok | |
| D549,673 | S | 8/2007 | Niitsu | |
| 7,269,263 | B2 | 9/2007 | Dedieu | |
| D552,570 | S | 10/2007 | Niitsu | |
| D559,553 | S | 1/2008 | Mischel | |
| 7,333,476 | B2 | 2/2008 | Leblanc | |
| D566,685 | S | 4/2008 | Koller | |
| 7,359,504 | B1 | 4/2008 | Reuss | |
| 7,366,310 | B2 | 4/2008 | Stinson | |
| 7,387,151 | B1 | 6/2008 | Payne | |
| 7,412,376 | B2 | 8/2008 | Florencio | |
| 7,415,117 | B2 | 8/2008 | Tashev | |
| D578,509 | S | 10/2008 | Thomas | |
| D581,510 | S | 11/2008 | Albano | |
| D582,391 | S | 12/2008 | Morimoto | |
| D587,709 | S | 3/2009 | Niitsu | |
| D589,605 | S | 3/2009 | Reedy | |
| 7,503,616 | B2 | 3/2009 | Linhard | |
| 7,515,719 | B2 | 4/2009 | Hooley | |
| 7,536,769 | B2 | 5/2009 | Pedersen | |
| D595,402 | S | 6/2009 | Miyake | |
| D595,736 | S | 7/2009 | Son | |
| 7,558,381 | B1 | 7/2009 | Ali | |
| 7,561,700 | B1 | 7/2009 | Bernardi | |
| 7,565,949 | B2 | 7/2009 | Tojo | |
| D601,585 | S | 10/2009 | Andre | |
| 7,651,390 | B1 | 1/2010 | Profeta | |
| 7,660,428 | B2 | 2/2010 | Rodman | |
| 7,667,728 | B2 | 2/2010 | Kenoyer | |
| 7,672,445 | B1 | 3/2010 | Zhang | |
| D613,338 | S | 4/2010 | Marukos | |
| 7,701,110 | B2 | 4/2010 | Fukuda | |
| 7,702,116 | B2 | 4/2010 | Stone | |
| D614,871 | S | 5/2010 | Tang | |
| 7,724,891 | B2 | 5/2010 | Beaucoup | |
| D617,441 | S | 6/2010 | Koury | |
| 7,747,001 | B2 | 6/2010 | Kellermann | |
| 7,756,278 | B2 | 7/2010 | Moorer | |
| 7,783,063 | B2 | 8/2010 | Pocino | |
| 7,787,328 | B2 | 8/2010 | Chu | |
| 7,830,862 | B2 | 11/2010 | James | |
| 7,831,035 | B2 | 11/2010 | Stokes | |
| 7,831,036 | B2 | 11/2010 | Beaucoup | |
| 7,856,097 | B2 | 12/2010 | Tokuda | |
| 7,881,486 | B1 | 2/2011 | Killion | |
| 7,894,421 | B2 | 2/2011 | Kwan | |
| D636,188 | S | 4/2011 | Kim | |
| 7,925,006 | B2 | 4/2011 | Hirai | |
| 7,925,007 | B2 | 4/2011 | Stokes | |
| 7,936,886 | B2 | 5/2011 | Kim | |
| 7,970,123 | B2 | 6/2011 | Beaucoup | |
| 7,970,151 | B2 | 6/2011 | Oxford | |
| D642,385 | S | 8/2011 | Lee | |
| D643,015 | S | 8/2011 | Kim | |
| 7,991,167 | B2 | 8/2011 | Oxford | |
| 7,995,768 | B2 | 8/2011 | Miki | |
| 8,000,481 | B2 | 8/2011 | Nishikawa | |
| 8,005,238 | B2 | 8/2011 | Tashev | |
| 8,019,091 | B2 | 9/2011 | Burnett | |
| 8,041,054 | B2 | 10/2011 | Yeldener | |
| 8,059,843 | B2 | 11/2011 | Hung | |
| 8,064,629 | B2 | 11/2011 | Jiang | |
| 8,085,947 | B2 | 12/2011 | Haulick | |
| 8,085,949 | B2 | 12/2011 | Kim | |
| 8,095,120 | B1 | 1/2012 | Blair | |
| 8,098,842 | B2 | 1/2012 | Florencio | |
| 8,098,844 | B2 | 1/2012 | Elko | |
| 8,103,030 | B2 | 1/2012 | Barthel | |
| 8,109,360 | B2 | 2/2012 | Stewart, Jr. | |
| 8,112,272 | B2 | 2/2012 | Nagahama | |
| 8,116,500 | B2 | 2/2012 | Oxford | |
| 8,121,834 | B2 | 2/2012 | Rosec | |
| D655,271 | S | 3/2012 | Park | |
| D656,473 | S | 3/2012 | Laube | |
| 8,130,969 | B2 | 3/2012 | Buck | |
| 8,130,977 | B2 | 3/2012 | Chu | |
| 8,135,143 | B2 | 3/2012 | Ishibashi | |
| 8,144,886 | B2 | 3/2012 | Ishibashi | |
| D658,153 | S | 4/2012 | Woo | |
| 8,155,331 | B2 | 4/2012 | Nakadai | |
| 8,170,882 | B2 | 5/2012 | Davis | |
| 8,175,291 | B2 | 5/2012 | Chan | |
| 8,175,871 | B2 | 5/2012 | Wang | |
| 8,184,801 | B1 | 5/2012 | Hamalainen | |
| 8,189,765 | B2 | 5/2012 | Nishikawa | |
| 8,189,810 | B2 | 5/2012 | Wolff | |
| 8,194,863 | B2 | 6/2012 | Takumai | |
| 8,199,927 | B1 | 6/2012 | Raftery | |
| 8,204,198 | B2 | 6/2012 | Adeney | |
| 8,204,248 | B2 | 6/2012 | Haulick | |
| 8,208,664 | B2 | 6/2012 | Iwasaki | |
| 8,213,596 | B2 | 7/2012 | Beaucoup | |
| 8,213,634 | B1 | 7/2012 | Daniel | |
| 8,219,387 | B2 | 7/2012 | Cutler | |
| 8,229,134 | B2 | 7/2012 | Duraiswami | |
| 8,233,352 | B2 | 7/2012 | Beaucoup | |
| 8,243,951 | B2 | 8/2012 | Ishibashi | |
| 8,244,536 | B2 | 8/2012 | Arun | |
| 8,249,273 | B2 | 8/2012 | Inoda | |
| 8,259,959 | B2 | 9/2012 | Marton | |
| 8,275,120 | B2 | 9/2012 | Stokes, III | |
| 8,280,072 | B2 * | 10/2012 | Burnett | H04R 1/406<br>381/94.1 |
| 8,280,728 | B2 | 10/2012 | Chen | |
| 8,284,949 | B2 | 10/2012 | Farhang | |
| 8,284,952 | B2 | 10/2012 | Reining | |
| 8,286,749 | B2 | 10/2012 | Stewart | |
| 8,290,142 | B1 | 10/2012 | Lambert | |
| 8,291,670 | B2 | 10/2012 | Gard | |
| 8,297,402 | B2 | 10/2012 | Stewart | |
| 8,315,380 | B2 | 11/2012 | Liu | |
| 8,331,582 | B2 | 12/2012 | Steele | |
| 8,345,898 | B2 | 1/2013 | Reining | |
| 8,355,521 | B2 | 1/2013 | Larson | |
| 8,370,140 | B2 | 2/2013 | Vitte | |
| 8,379,823 | B2 | 2/2013 | Ratmanski | |
| 8,385,557 | B2 | 2/2013 | Tashev | |
| D678,329 | S | 3/2013 | Lee | |
| 8,395,653 | B2 | 3/2013 | Feng | |
| 8,403,107 | B2 | 3/2013 | Stewart | |
| 8,406,436 | B2 | 3/2013 | Craven | |
| 8,428,661 | B2 | 4/2013 | Chen | |
| 8,433,061 | B2 | 4/2013 | Cutler | |
| D682,266 | S | 5/2013 | Wu | |
| 8,437,490 | B2 | 5/2013 | Marton | |
| 8,443,930 | B2 | 5/2013 | Stewart, Jr. | |
| 8,447,590 | B2 | 5/2013 | Ishibashi | |
| 8,472,639 | B2 | 6/2013 | Reining | |
| 8,472,640 | B2 | 6/2013 | Marton | |
| D685,346 | S | 7/2013 | Szymanski | |
| D686,182 | S | 7/2013 | Ashiwa | |
| 8,479,871 | B2 | 7/2013 | Stewart | |
| 8,483,398 | B2 | 7/2013 | Fozunbal | |
| 8,498,423 | B2 | 7/2013 | Thaden | |
| D687,432 | S | 8/2013 | Duan | |
| 8,503,653 | B2 | 8/2013 | Ahuja | |
| 8,515,089 | B2 | 8/2013 | Nicholson | |
| 8,515,109 | B2 | 8/2013 | Dittberner | |
| 8,526,633 | B2 | 9/2013 | Ukai | |
| 8,553,904 | B2 | 10/2013 | Said | |
| 8,559,611 | B2 | 10/2013 | Ratmanski | |
| D693,328 | S | 11/2013 | Goetzen | |
| 8,583,481 | B2 | 11/2013 | Viveiros | |
| 8,599,194 | B2 | 12/2013 | Lewis | |
| 8,600,443 | B2 | 12/2013 | Kawaguchi | |
| 8,605,890 | B2 | 12/2013 | Zhang | |
| 8,620,650 | B2 | 12/2013 | Walters | |

(56) References Cited

U.S. PATENT DOCUMENTS 8,630,431 B2 1/2014 Gran
8,631,897 B2 1/2014 Stewart
8,634,569 B2 1/2014 Lu
8,638,951 B2 1/2014 Zurek
D699,712 S 2/2014 Bourne
8,644,477 B2 2/2014 Gilbert
8,654,955 B1 2/2014 Lambert
8,654,990 B2 2/2014 Faller
8,660,274 B2 2/2014 Wolff
8,660,275 B2 2/2014 Buck
8,666,090 B1 * 3/2014 Townsend .............. H04R 3/005 381/92
8,670,581 B2 3/2014 Harman
8,672,087 B2 3/2014 Stewart
8,675,890 B2 3/2014 Schmidt
8,675,899 B2 3/2014 Jung
8,676,728 B1 3/2014 Velusamy
8,682,675 B2 3/2014 Togami
8,724,829 B2 5/2014 Visser
8,730,156 B2 5/2014 Weising
8,744,069 B2 6/2014 Cutler
8,744,101 B1 6/2014 Burns
8,755,536 B2 6/2014 Chen
8,787,560 B2 7/2014 Buck
8,811,601 B2 8/2014 Mohammad
8,818,002 B2 8/2014 Tashev
8,824,693 B2 9/2014 Åhgren
8,842,851 B2 9/2014 Beaucoup
8,855,326 B2 10/2014 Derkx
8,855,327 B2 10/2014 Tanaka
8,861,713 B2 10/2014 Xu
8,861,756 B2 10/2014 Zhu
8,873,789 B2 10/2014 Bigeh
D717,272 S 11/2014 Kim
8,886,343 B2 11/2014 Ishibashi
8,891,785 B2 * 11/2014 Sorensen .................. G01S 3/86 381/94.1
8,893,849 B2 11/2014 Hudson
8,898,633 B2 11/2014 Bryant
D718,731 S 12/2014 Lee
8,903,106 B2 12/2014 Meyer
8,923,529 B2 12/2014 McCowan
8,929,564 B2 1/2015 Kikkeri
8,942,382 B2 1/2015 Elko
8,965,546 B2 2/2015 Visser
D725,059 S 3/2015 Kim
D725,631 S 3/2015 McNamara
8,976,977 B2 3/2015 De
8,983,089 B1 3/2015 Chu
8,983,834 B2 3/2015 Davis
D726,144 S 4/2015 Kang
D727,968 S 4/2015 Onoue
9,002,028 B2 4/2015 Haulick
D729,767 S 5/2015 Lee
9,038,301 B2 5/2015 Zelbacher
9,084,038 B2 * 7/2015 Siotis ..................... H04R 3/005
9,088,336 B2 7/2015 Mani
9,094,496 B2 7/2015 Teutsch
D735,717 S 8/2015 Lam
D737,245 S 8/2015 Fan
9,099,094 B2 8/2015 Burnett
9,107,001 B2 8/2015 Diethorn
9,111,543 B2 8/2015 Åhgren
9,113,242 B2 8/2015 Hyun
9,113,247 B2 8/2015 Chatlani
9,126,827 B2 9/2015 Hsieh
9,129,223 B1 9/2015 Velusamy
9,140,054 B2 9/2015 Oberbroeckling
D740,279 S 10/2015 Wu
9,172,345 B2 10/2015 Kok
D743,376 S 11/2015 Kim
D743,939 S 11/2015 Seong
9,196,261 B2 11/2015 Burnett
9,197,974 B1 11/2015 Clark
9,203,494 B2 12/2015 Tarighat Mehrabani
9,215,327 B2 12/2015 Bathurst
9,215,543 B2 12/2015 Sun
9,226,062 B2 12/2015 Sun
9,226,070 B2 12/2015 Hyun
9,226,088 B2 12/2015 Pandey
9,232,185 B2 1/2016 Graham
9,237,391 B2 1/2016 Benesty
9,247,367 B2 1/2016 Nobile
9,253,567 B2 2/2016 Morcelli
9,257,132 B2 2/2016 Gowreesunker
9,264,553 B2 2/2016 Pandey
9,264,805 B2 2/2016 Buck
9,280,985 B2 3/2016 Tawada
9,286,908 B2 3/2016 Zhang
9,294,839 B2 3/2016 Lambert
9,301,049 B2 3/2016 Elko
D754,103 S 4/2016 Fischer
9,307,326 B2 4/2016 Elko
9,319,532 B2 4/2016 Bao
9,319,799 B2 4/2016 Salmon
9,326,060 B2 4/2016 Nicholson
D756,502 S 5/2016 Lee
9,330,673 B2 5/2016 Cho
9,338,301 B2 5/2016 Pocino
9,338,549 B2 5/2016 Haulick
9,354,310 B2 5/2016 Visser
9,357,080 B2 5/2016 Beaucoup
9,403,670 B2 8/2016 Schelling
9,426,598 B2 8/2016 Walsh
D767,748 S 9/2016 Nakai
9,451,078 B2 9/2016 Yang
D769,239 S 10/2016 Li
9,462,378 B2 10/2016 Kuech
9,473,868 B2 10/2016 Huang
9,479,627 B1 10/2016 Rung
9,479,885 B1 10/2016 Ivanov
9,489,948 B1 11/2016 Chu
9,510,090 B2 11/2016 Lissek
9,514,723 B2 12/2016 Silfvast
9,516,412 B2 12/2016 Shigenaga
9,521,057 B2 12/2016 Klingbeil
9,549,245 B2 1/2017 Frater
9,560,446 B1 1/2017 Chang
9,560,451 B2 1/2017 Eichfeld
9,565,493 B2 * 2/2017 Abraham ................. H04R 1/02
9,565,507 B2 2/2017 Case
9,578,413 B2 2/2017 Sawa
9,578,440 B2 2/2017 Otto
9,589,556 B2 3/2017 Gao
9,591,123 B2 3/2017 Sorensen
9,591,404 B1 3/2017 Chhetri
D784,299 S 4/2017 Cho
9,615,173 B2 4/2017 Sako
9,628,596 B1 4/2017 Bullough
9,635,186 B2 4/2017 Pandey
9,635,474 B2 4/2017 Kuster
D787,481 S 5/2017 Tyss
D788,073 S 5/2017 Silvera
9,640,187 B2 5/2017 Niemisto
9,641,688 B2 5/2017 Pandey
9,641,929 B2 5/2017 Li
9,641,935 B1 5/2017 Ivanov
9,653,091 B2 5/2017 Matsuo
9,653,092 B2 5/2017 Sun
9,655,001 B2 5/2017 Metzger
9,659,576 B1 5/2017 Kotvis
D789,323 S 6/2017 MacKiewicz
9,674,604 B2 6/2017 Deroo
9,692,882 B2 6/2017 Mani
9,706,057 B2 7/2017 Mani
9,716,944 B2 7/2017 Yliaho
9,721,582 B1 8/2017 Huang
9,734,835 B2 8/2017 Fujieda
9,754,572 B2 9/2017 Salazar
9,761,243 B2 9/2017 Taenzer
D801,285 S 10/2017 Timmins
9,788,119 B2 10/2017 Vilermo
9,813,806 B2 11/2017 Graham
9,818,426 B2 11/2017 Kotera

(56) References Cited

U.S. PATENT DOCUMENTS 9,826,211 B2 11/2017 Sawa
9,854,101 B2 12/2017 Pandey
9,854,363 B2 12/2017 Sladeczek
9,860,439 B2 1/2018 Sawa
9,866,952 B2 1/2018 Pandey
D811,393 S 2/2018 Ahn
9,894,434 B2 2/2018 Rollow, IV
9,930,448 B1 3/2018 Chen
9,936,290 B2 4/2018 Mohammad
9,966,059 B1 5/2018 Ayrapetian
9,973,848 B2 5/2018 Chhetri
9,980,042 B1 5/2018 Benattar
D819,607 S 6/2018 Chui
D819,631 S 6/2018 Matsumiya
10,015,589 B1 7/2018 Ebenezer
10,021,506 B2 7/2018 Johnson
10,021,515 B1 7/2018 Mallya
10,034,116 B2 7/2018 Kadri
10,038,769 B2 7/2018 Ukai
10,054,320 B2 8/2018 Choi
10,061,009 B1 8/2018 Family
10,062,379 B2 8/2018 Katuri
10,153,744 B1 12/2018 Every
10,165,386 B2 12/2018 Lehtiniemi
D841,589 S 2/2019 Böhmer
10,206,030 B2 2/2019 Matsumoto
10,210,882 B1 2/2019 McCowan
10,231,062 B2 3/2019 Pedersen
10,244,121 B2 3/2019 Mani
10,244,219 B2 3/2019 Sawa
10,249,299 B1 * 4/2019 Hart .................... G10L 21/0208
10,269,343 B2 4/2019 Wingate
10,366,702 B2 7/2019 Morton
10,367,948 B2 7/2019 Wells-Rutherford
D857,873 S 8/2019 Shimada
10,389,861 B2 8/2019 Mani
10,389,885 B2 8/2019 Sun
D860,319 S 9/2019 Beruto
D860,997 S 9/2019 Jhun
D864,136 S 10/2019 Kim
10,440,469 B2 10/2019 Barnett
D865,723 S 11/2019 Cho
10,566,008 B2 2/2020 Thorpe
10,602,267 B2 3/2020 Grosche
10,609,460 B2 * 3/2020 McElveen .............. H04R 3/005
D883,952 S 5/2020 Lucas
10,650,797 B2 5/2020 Kumar
D888,020 S 6/2020 Lyu
10,728,653 B2 7/2020 Graham
D900,070 S 10/2020 Lantz
D900,071 S 10/2020 Lantz
D900,072 S 10/2020 Lantz
D900,073 S 10/2020 Lantz
D900,074 S 10/2020 Lantz
10,827,263 B2 11/2020 Christoph
10,863,270 B1 * 12/2020 O'Neill .................. H04R 1/406
10,930,297 B2 2/2021 Christoph
10,959,018 B1 3/2021 Shi
10,979,805 B2 4/2021 Chowdhary
D924,189 S 7/2021 Park
11,109,133 B2 8/2021 Lantz
D940,116 S 1/2022 Cho
11,218,802 B1 1/2022 Kandadai
11,310,592 B2 * 4/2022 Abraham ............... H04R 31/00
11,832,053 B2 * 11/2023 Abraham ............... H04R 31/00
11,950,050 B1 * 4/2024 Graham .............. G10L 21/0232
2001/0031058 A1 10/2001 Anderson
2002/0015500 A1 2/2002 Belt
2002/0041679 A1 4/2002 Beaucoup
2002/0048377 A1 4/2002 Vaudrey
2002/0064158 A1 5/2002 Yokoyama
2002/0064287 A1 5/2002 Kawamura
2002/0069054 A1 6/2002 Arrowood
2002/0110255 A1 8/2002 Killion
2002/0126861 A1 9/2002 Colby
2002/0131580 A1 9/2002 Smith
2002/0140633 A1 10/2002 Rafii
2002/0146282 A1 10/2002 Wilkes
2002/0149070 A1 10/2002 Sheplak
2002/0159603 A1 10/2002 Hirai
2003/0026437 A1 2/2003 Janse
2003/0053639 A1 3/2003 Beaucoup
2003/0059061 A1 3/2003 Tsuji
2003/0063762 A1 4/2003 Tajima
2003/0063768 A1 4/2003 Cornelius
2003/0072461 A1 4/2003 Moorer
2003/0107478 A1 6/2003 Hendricks
2003/0118200 A1 6/2003 Beaucoup
2003/0122777 A1 7/2003 Grover
2003/0138119 A1 7/2003 Pocino
2003/0156725 A1 8/2003 Boone
2003/0161485 A1 8/2003 Smith
2003/0163326 A1 8/2003 Maase
2003/0169888 A1 9/2003 Subotic
2003/0185404 A1 10/2003 Milsap
2003/0198339 A1 10/2003 Roy
2003/0198359 A1 10/2003 Killion
2003/0202107 A1 10/2003 Slattery
2004/0013038 A1 1/2004 Kajala
2004/0013252 A1 1/2004 Craner
2004/0076305 A1 4/2004 Santiago
2004/0105557 A1 6/2004 Matsuo
2004/0120532 A1 * 6/2004 Dedieu .................. H04R 1/406 381/91
2004/0125942 A1 7/2004 Beaucoup
2004/0175006 A1 * 9/2004 Kim ....................... H04R 3/005 381/92
2004/0202345 A1 10/2004 Stenberg
2004/0240664 A1 12/2004 Freed
2005/0005494 A1 1/2005 Way
2005/0041530 A1 2/2005 Goudie
2005/0069156 A1 3/2005 Haapapuro
2005/0094580 A1 5/2005 Kumar
2005/0094795 A1 5/2005 Rambo
2005/0149320 A1 7/2005 Kajala
2005/0157897 A1 7/2005 Saltykov
2005/0175189 A1 8/2005 Lee
2005/0175190 A1 8/2005 Tashev
2005/0213747 A1 9/2005 Popovich
2005/0221867 A1 10/2005 Zurek
2005/0238196 A1 10/2005 Furuno
2005/0270906 A1 12/2005 Ramenzoni
2005/0271221 A1 * 12/2005 Cerwin .................. H04R 3/005 381/91
2005/0286698 A1 12/2005 Bathurst
2005/0286729 A1 12/2005 Harwood
2006/0083390 A1 4/2006 Kaderavek
2006/0088173 A1 4/2006 Rodman
2006/0093128 A1 5/2006 Oxford
2006/0098403 A1 5/2006 Smith
2006/0104458 A1 * 5/2006 Kenoyer ................ H04R 3/005 381/92
2006/0109983 A1 5/2006 Young
2006/0151256 A1 7/2006 Lee
2006/0159293 A1 7/2006 Azima
2006/0161430 A1 7/2006 Schweng
2006/0165242 A1 7/2006 Miki
2006/0192976 A1 8/2006 Hall
2006/0198541 A1 9/2006 Henry
2006/0204022 A1 9/2006 Hooley
2006/0215866 A1 9/2006 Francisco
2006/0222187 A1 10/2006 Jarrett
2006/0233353 A1 10/2006 Beaucoup
2006/0239471 A1 10/2006 Mao
2006/0262942 A1 11/2006 Oxford
2006/0269080 A1 11/2006 Oxford
2006/0269086 A1 11/2006 Page
2007/0006474 A1 1/2007 Taniguchi
2007/0009116 A1 1/2007 Reining
2007/0019828 A1 1/2007 Hughes
2007/0053524 A1 3/2007 Haulick
2007/0093714 A1 4/2007 Beaucoup
2007/0116255 A1 5/2007 Derkx
2007/0120029 A1 5/2007 Keung

(56) References Cited

U.S. PATENT DOCUMENTS

2007/0165871 A1 7/2007 Roovers
2007/0230712 A1 10/2007 Belt
2007/0253561 A1 11/2007 Williams
2007/0269066 A1 11/2007 Derleth
2008/0008339 A1 1/2008 Ryan
2008/0033723 A1 2/2008 Jang
2008/0046235 A1 2/2008 Chen
2008/0056517 A1 3/2008 Algazi
2008/0101622 A1 5/2008 Sugiyama
2008/0130907 A1 6/2008 Sudo
2008/0144848 A1 6/2008 Buck
2008/0152167 A1 6/2008 Taenzer
2008/0168283 A1 7/2008 Penning
2008/0175375 A1 7/2008 Ishiguro
2008/0188965 A1 8/2008 Bruey
2008/0212805 A1 9/2008 Fincham
2008/0232607 A1 9/2008 Tashev
2008/0247567 A1 10/2008 Kjolerbakken
2008/0253553 A1 10/2008 Li
2008/0253589 A1 10/2008 Trahms
2008/0259731 A1 10/2008 Happonen
2008/0260175 A1 10/2008 Elko
2008/0267422 A1 10/2008 Cox
2008/0279400 A1 11/2008 Knoll
2008/0285772 A1 11/2008 Haulick
2009/0003586 A1 1/2009 Lai
2009/0003626 A1 1/2009 Burnett
2009/0030536 A1 1/2009 Gur
2009/0052684 A1 2/2009 Ishibashi
2009/0052686 A1 2/2009 Wu
2009/0052715 A1 2/2009 Zhang
2009/0086998 A1 4/2009 Jeong
2009/0087000 A1 4/2009 Ko
2009/0087001 A1 4/2009 Jiang
2009/0094817 A1 4/2009 Killion
2009/0129609 A1 5/2009 Oh
2009/0147967 A1 6/2009 Ishibashi
2009/0150149 A1 6/2009 Cutter
2009/0161880 A1 6/2009 Hooley
2009/0169027 A1 7/2009 Ura
2009/0173030 A1 7/2009 Gulbrandsen
2009/0173570 A1 7/2009 Levit
2009/0226004 A1 9/2009 Soerensen
2009/0233545 A1 9/2009 Sutskover
2009/0237561 A1 9/2009 Kobayashi
2009/0254340 A1 10/2009 Sun
2009/0274318 A1 11/2009 Ishibashi
2009/0287482 A1 11/2009 Hetherington
2009/0310794 A1 12/2009 Ishibashi
2010/0011644 A1 1/2010 Kramer
2010/0034397 A1 2/2010 Nakadai
2010/0074433 A1 3/2010 Zhang
2010/0111323 A1 5/2010 Marton
2010/0111324 A1 5/2010 Yeldener
2010/0119097 A1 5/2010 Ohtsuka
2010/0123785 A1* 5/2010 Chen .................... H04N 23/611 382/118
2010/0128892 A1 5/2010 Chen
2010/0128901 A1 5/2010 Herman
2010/0131749 A1 5/2010 Kim
2010/0142721 A1 6/2010 Wada
2010/0150364 A1 6/2010 Buck
2010/0158268 A1 6/2010 Marton
2010/0165071 A1 7/2010 Ishibashi
2010/0166219 A1 7/2010 Marton
2010/0189275 A1 7/2010 Christoph
2010/0189299 A1 7/2010 Grant
2010/0202628 A1 8/2010 Meyer
2010/0208605 A1 8/2010 Wang
2010/0215184 A1 8/2010 Buck
2010/0215189 A1 8/2010 Marton
2010/0217590 A1 8/2010 Nemer
2010/0245624 A1 9/2010 Beaucoup
2010/0246873 A1 9/2010 Chen
2010/0284185 A1 11/2010 Ngai
2010/0305728 A1 12/2010 Aiso
2010/0314513 A1 12/2010 Evans
2010/0329478 A1 12/2010 Kubin
2011/0002469 A1 1/2011 Ojala
2011/0007921 A1 1/2011 Stewart
2011/0033063 A1 2/2011 McGrath
2011/0038229 A1 2/2011 Beaucoup
2011/0096136 A1 4/2011 Liu
2011/0096631 A1 4/2011 Kondo
2011/0096915 A1 4/2011 Nemer
2011/0164761 A1 7/2011 McCowan
2011/0194719 A1 8/2011 Frater
2011/0211706 A1 9/2011 Tanaka
2011/0235821 A1 9/2011 Okita
2011/0268287 A1 11/2011 Ishibashi
2011/0311064 A1 12/2011 Teutsch
2011/0311085 A1 12/2011 Stewart
2011/0317862 A1 12/2011 Hosoe
2012/0002835 A1 1/2012 Stewart
2012/0014049 A1 1/2012 Ogle
2012/0027227 A1 2/2012 Kok
2012/0070015 A1 3/2012 Oh
2012/0076316 A1 3/2012 Zhu
2012/0080260 A1 4/2012 Stewart
2012/0093344 A1 4/2012 Sun
2012/0106755 A1 5/2012 Zhang
2012/0114138 A1* 5/2012 Hyun ..................... H04R 3/005 381/92
2012/0117474 A1 5/2012 Miki
2012/0128160 A1 5/2012 Kim
2012/0128166 A1 5/2012 Kim
2012/0128175 A1 5/2012 Visser
2012/0155688 A1 6/2012 Wilson
2012/0155703 A1 6/2012 Hernandez-Abrego
2012/0163625 A1* 6/2012 Siotis ..................... H04R 3/005 381/92
2012/0169826 A1 7/2012 Jeong
2012/0177219 A1 7/2012 Mullen
2012/0182429 A1 7/2012 Forutanpour
2012/0185247 A1* 7/2012 Tzirkel-Hancock ... H04R 3/005 381/92
2012/0207335 A1 8/2012 Spaanderman
2012/0224709 A1 9/2012 Keddem
2012/0230511 A1 9/2012 Burnett
2012/0243698 A1 9/2012 Elko
2012/0262536 A1 10/2012 Chen
2012/0263019 A1 10/2012 Armstong-Muntner
2012/0288079 A1 11/2012 Burnett
2012/0288114 A1 11/2012 Duraiswami
2012/0294472 A1 11/2012 Hudson
2012/0327115 A1 12/2012 Chhetri
2012/0328142 A1 12/2012 Horibe
2013/0002797 A1 1/2013 Thapa
2013/0004013 A1 1/2013 Stewart
2013/0015014 A1 1/2013 Stewart
2013/0016847 A1 1/2013 Steiner
2013/0028451 A1 1/2013 De Roo
2013/0029684 A1 1/2013 Kawaguchi
2013/0034241 A1* 2/2013 Pandey ............... G10L 21/0208 381/92
2013/0039504 A1 2/2013 Pandey
2013/0083832 A1* 4/2013 Sorensen ................ G01S 3/805 375/224
2013/0083911 A1 4/2013 Bathurst
2013/0094689 A1 4/2013 Tanaka
2013/0101136 A1 4/2013 McElveen
2013/0101141 A1 4/2013 McElveen
2013/0106997 A1* 5/2013 Kim ..................... H04N 13/204 348/43
2013/0136274 A1 5/2013 Aehgren
2013/0142343 A1 6/2013 Matsui
2013/0147835 A1 6/2013 Lee
2013/0156198 A1 6/2013 Kim
2013/0182190 A1 7/2013 McCartney
2013/0206501 A1 8/2013 Yu
2013/0216066 A1 8/2013 Yerrace
2013/0226593 A1 8/2013 Magnusson
2013/0251181 A1 9/2013 Stewart
2013/0264144 A1 10/2013 Hudson

(56) References Cited

U.S. PATENT DOCUMENTS

2013/0271559 A1 10/2013 Feng
2013/0282372 A1 10/2013 Visser
2013/0294616 A1 11/2013 Mulder
2013/0297302 A1 11/2013 Pan
2013/0304476 A1 11/2013 Kim
2013/0304479 A1 11/2013 Teller
2013/0329908 A1 12/2013 Lindahl
2013/0332156 A1 12/2013 Tackin
2013/0336516 A1 12/2013 Stewart
2013/0343549 A1 12/2013 Vemireddy
2014/0003635 A1 1/2014 Mohammad
2014/0010383 A1 1/2014 MacKey
2014/0016794 A1 1/2014 Lu
2014/0029761 A1 1/2014 Maenpaa
2014/0037097 A1 2/2014 Mark
2014/0050332 A1 2/2014 Nielsen
2014/0072151 A1 3/2014 Ochs
2014/0098233 A1 4/2014 Martin
2014/0098964 A1 4/2014 Rosca
2014/0122060 A1 5/2014 Kaszczuk
2014/0126746 A1 5/2014 Shin
2014/0177857 A1 6/2014 Kuster
2014/0233777 A1 8/2014 Tseng
2014/0233778 A1 8/2014 Hardiman
2014/0264654 A1 9/2014 Salmon
2014/0265774 A1 9/2014 Stewart
2014/0270271 A1 9/2014 Dehe
2014/0286518 A1 9/2014 Stewart
2014/0294211 A1 10/2014 Schneider
2014/0295768 A1 10/2014 Wu
2014/0301586 A1 10/2014 Stewart
2014/0307882 A1 10/2014 Leblanc
2014/0314251 A1 10/2014 Rosca
2014/0341392 A1 11/2014 Lambert
2014/0357177 A1 12/2014 Stewart
2014/0363008 A1 12/2014 Chen
2015/0003638 A1 1/2015 Kasai
2015/0016628 A1* 1/2015 Li .......................... H04R 3/005
381/92
2015/0024799 A1 1/2015 Swanson
2015/0025878 A1 1/2015 Gowreesunker
2015/0030172 A1 1/2015 Gaensler
2015/0033042 A1 1/2015 Iwamoto
2015/0050967 A1 2/2015 Bao
2015/0055796 A1 2/2015 Nugent
2015/0055797 A1 2/2015 Nguyen
2015/0063579 A1 3/2015 Bao
2015/0070188 A1 3/2015 Aramburu
2015/0078581 A1 3/2015 Etter
2015/0078582 A1* 3/2015 Graham .............. G10L 21/0232
381/92
2015/0097719 A1 4/2015 Balachandreswaran
2015/0104023 A1 4/2015 Bilobrov
2015/0117672 A1 4/2015 Christoph
2015/0118960 A1 4/2015 Petit
2015/0126255 A1 5/2015 Yang
2015/0156578 A1 6/2015 Alexandridis
2015/0163577 A1 6/2015 Benesty
2015/0185825 A1 7/2015 Mullins
2015/0189423 A1 7/2015 Giannuzzi
2015/0195644 A1 7/2015 Wilson
2015/0208171 A1 7/2015 Funakoshi
2015/0237424 A1 8/2015 Wilker
2015/0281832 A1 10/2015 Kishimoto
2015/0281833 A1 10/2015 Shigenaga
2015/0281834 A1 10/2015 Takano
2015/0312662 A1 10/2015 Kishimoto
2015/0312691 A1 10/2015 Virolainen
2015/0319524 A1* 11/2015 Wang ...................... G01S 15/42
381/92
2015/0326968 A1 11/2015 Shigenaga
2015/0341734 A1 11/2015 Sherman
2015/0350621 A1 12/2015 Sawa
2015/0358734 A1 12/2015 Butler
2016/0011851 A1 1/2016 Zhang
2016/0021478 A1 1/2016 Katagiri
2016/0029120 A1 1/2016 Nesta
2016/0031700 A1 2/2016 Sparks
2016/0037277 A1 2/2016 Matsumoto
2016/0055859 A1 2/2016 Finlow-Bates
2016/0080867 A1 3/2016 Nugent
2016/0088392 A1 3/2016 Huttunen
2016/0100092 A1 4/2016 Bohac
2016/0105473 A1 4/2016 Klingbeil
2016/0111109 A1 4/2016 Tsujikawa
2016/0127527 A1 5/2016 Mani
2016/0134928 A1 5/2016 Ogle
2016/0142548 A1 5/2016 Pandey
2016/0142814 A1 5/2016 Deroo
2016/0142815 A1 5/2016 Norris
2016/0148057 A1 5/2016 Oh
2016/0150315 A1 5/2016 Tzirkel-Hancock
2016/0150316 A1 5/2016 Kubota
2016/0155455 A1 6/2016 Ojanperä
2016/0161588 A1 6/2016 Benattar
2016/0165339 A1 6/2016 Benattar
2016/0165340 A1 6/2016 Benattar
2016/0165341 A1 6/2016 Benattar
2016/0173976 A1 6/2016 Podhradsky
2016/0173978 A1* 6/2016 Li ....................... G10L 21/0364
381/92
2016/0189727 A1 6/2016 Wu
2016/0192068 A1 6/2016 Ng
2016/0196836 A1 7/2016 Yu
2016/0234593 A1 8/2016 Matsumoto
2016/0245698 A1 8/2016 Pau
2016/0249132 A1 8/2016 Oliaei
2016/0275961 A1 9/2016 Yu
2016/0295279 A1 10/2016 Srinivasan
2016/0300584 A1 10/2016 Pandey
2016/0302002 A1 10/2016 Lambert
2016/0302006 A1 10/2016 Pandey
2016/0323667 A1 11/2016 Shumard
2016/0323668 A1* 11/2016 Abraham ................. H04R 1/02
2016/0330545 A1 11/2016 McElveen
2016/0337523 A1 11/2016 Pandey
2016/0353200 A1 12/2016 Bigeh
2016/0357508 A1 12/2016 Moore
2017/0019744 A1 1/2017 Matsumoto
2017/0064451 A1 3/2017 Park
2017/0105066 A1 4/2017 McLaughlin
2017/0134849 A1 5/2017 Pandey
2017/0134850 A1* 5/2017 Graham ................... H04R 3/04
2017/0164101 A1 6/2017 Rollow, IV
2017/0180861 A1 6/2017 Chen
2017/0206064 A1 7/2017 Breazeal
2017/0230748 A1 8/2017 Shumard
2017/0264999 A1 9/2017 Fukuda
2017/0303887 A1 10/2017 Richmond
2017/0308352 A1 10/2017 Kessler
2017/0374454 A1 12/2017 Bernardini
2018/0083848 A1 3/2018 Siddiqi
2018/0102135 A1 4/2018 Ebenezer
2018/0102136 A1 4/2018 Ebenezer
2018/0109873 A1 4/2018 Xiang
2018/0115799 A1 4/2018 Thiele
2018/0160224 A1 6/2018 Graham
2018/0196585 A1 7/2018 Densham
2018/0219922 A1 8/2018 Bryans
2018/0227666 A1 8/2018 Barnett
2018/0292079 A1 10/2018 Branham
2018/0310096 A1 10/2018 Shumard
2018/0313558 A1 11/2018 Byers
2018/0338205 A1 11/2018 Abraham
2018/0359565 A1 12/2018 Kim
2019/0042187 A1 2/2019 Truong
2019/0124462 A1 4/2019 Lindahl
2019/0166424 A1 5/2019 Harney
2019/0182607 A1 6/2019 Pedersen
2019/0215540 A1 7/2019 Nicol
2019/0230436 A1 7/2019 Tsingos
2019/0259408 A1 8/2019 Freeman
2019/0268683 A1 8/2019 Miyahara
2019/0295540 A1 9/2019 Grima

(56) References Cited

U.S. PATENT DOCUMENTS

| | | | | |
|---|---|---|---|---|
| 2019/0295569 | A1 | 9/2019 | Wang | |
| 2019/0297422 | A1 | 9/2019 | Anderson | |
| 2019/0297542 | A1 | 9/2019 | Tang | |
| 2019/0319677 | A1 | 10/2019 | Hansen | |
| 2019/0371354 | A1 | 12/2019 | Lester | |
| 2019/0373362 | A1 | 12/2019 | Ansai | |
| 2019/0385629 | A1 | 12/2019 | Moravy | |
| 2019/0387311 | A1* | 12/2019 | Schultz | H04R 1/406 |
| 2020/0015021 | A1 | 1/2020 | Leppanen | |
| 2020/0021910 | A1 | 1/2020 | Rollow, IV | |
| 2020/0027472 | A1 | 1/2020 | Huang | |
| 2020/0037068 | A1 | 1/2020 | Barnett | |
| 2020/0068297 | A1 | 2/2020 | Rollow, IV | |
| 2020/0100009 | A1* | 3/2020 | Lantz | H04R 1/406 |
| 2020/0100025 | A1 | 3/2020 | Shumard | |
| 2020/0107137 | A1 | 4/2020 | Koutrouli | |
| 2020/0137485 | A1 | 4/2020 | Yamakawa | |
| 2020/0145753 | A1 | 5/2020 | Rollow, IV | |
| 2020/0152218 | A1 | 5/2020 | Kikuhara | |
| 2020/0162618 | A1 | 5/2020 | Enteshari | |
| 2020/0228663 | A1 | 7/2020 | Wells-Rutherford | |
| 2020/0251119 | A1 | 8/2020 | Yang | |
| 2020/0275204 | A1 | 8/2020 | Labosco | |
| 2020/0278043 | A1 | 9/2020 | Cao | |
| 2020/0288237 | A1 | 9/2020 | Abraham | |
| 2021/0012789 | A1 | 1/2021 | Husain | |
| 2021/0021940 | A1 | 1/2021 | Petersen | |
| 2021/0044881 | A1 | 2/2021 | Lantz | |
| 2021/0051397 | A1 | 2/2021 | Veselinovic | |
| 2021/0098014 | A1 | 4/2021 | Tanaka | |
| 2021/0098015 | A1 | 4/2021 | Pandey | |
| 2021/0120335 | A1 | 4/2021 | Veselinovic | |
| 2021/0200504 | A1 | 7/2021 | Park | |
| 2021/0243522 | A1 | 8/2021 | Rollow, IV | |
| 2021/0263126 | A1 | 8/2021 | Arai | |
| 2021/0375298 | A1 | 12/2021 | Zhang | |
| 2022/0369028 | A1 | 11/2022 | Abraham | |
| 2023/0224631 | A1* | 7/2023 | Lantz | H04R 1/288 181/199 |
| 2024/0187786 | A1* | 6/2024 | Abraham | H04R 31/00 |

FOREIGN PATENT DOCUMENTS

| | | |
|---|---|---|
| CA | 2359771 | 4/2003 |
| CA | 2475283 | 1/2005 |
| CA | 2505496 | 10/2006 |
| CA | 2838856 | 12/2012 |
| CA | 2846323 | 9/2014 |
| CN | 1204425 | 1/1999 |
| CN | 1780495 | 5/2006 |
| CN | 101217830 | 7/2008 |
| CN | 101388213 | 3/2009 |
| CN | 101833954 | 9/2010 |
| CN | 101860776 | 10/2010 |
| CN | 101894558 | 11/2010 |
| CN | 102646418 | 8/2012 |
| CN | 102821336 | 12/2012 |
| CN | 102833664 | 12/2012 |
| CN | 102860039 | 1/2013 |
| CN | 104036784 | 9/2014 |
| CN | 104053088 | 9/2014 |
| CN | 104080289 A1 | 10/2014 |
| CN | 104347076 | 2/2015 |
| CN | 104581463 | 4/2015 |
| CN | 105355210 | 2/2016 |
| CN | 105548998 | 5/2016 |
| CN | 106162427 | 11/2016 |
| CN | 106233751 | 12/2016 |
| CN | 106251857 | 12/2016 |
| CN | 106851036 | 6/2017 |
| CN | 107221336 | 9/2017 |
| CN | 107534725 | 1/2018 |
| CN | 108172235 | 6/2018 |
| CN | 109087664 | 12/2018 |
| CN | 208190895 | 12/2018 |
| CN | 109727604 | 5/2019 |
| CN | 110010147 | 7/2019 |
| CN | 306391029 | 3/2021 |
| DE | 2941485 | 4/1981 |
| EM | 0077546430001 | 3/2020 |
| EP | 0381498 | 8/1990 |
| EP | 0594098 | 4/1994 |
| EP | 0869697 | 10/1998 |
| EP | 1180914 | 2/2002 |
| EP | 1184676 | 3/2002 |
| EP | 0944228 | 6/2003 |
| EP | 1439526 | 7/2004 |
| EP | 1651001 | 4/2006 |
| EP | 1727344 | 11/2006 |
| EP | 1906707 | 4/2008 |
| EP | 1952393 | 8/2008 |
| EP | 1962547 | 8/2008 |
| EP | 2133867 | 12/2009 |
| EP | 2159789 | 3/2010 |
| EP | 2197219 | 6/2010 |
| EP | 2360940 | 8/2011 |
| EP | 2710788 | 3/2014 |
| EP | 2721837 | 4/2014 |
| EP | 2772910 | 9/2014 |
| EP | 2778310 | 9/2014 |
| EP | 2942975 | 11/2015 |
| EP | 2988527 | 2/2016 |
| EP | 3035556 | 6/2016 |
| EP | 3131311 | 2/2017 |
| GB | 2393601 | 3/2004 |
| GB | 2446620 | 8/2008 |
| GB | 2512155 | 9/2014 |
| GB | 2563857 | 1/2019 |
| JP | S63144699 | 6/1988 |
| JP | H01260967 | 10/1989 |
| JP | H0241099 | 2/1990 |
| JP | H05260589 | 10/1993 |
| JP | H07336790 | 12/1995 |
| JP | 2518823 | 7/1996 |
| JP | 3175622 | 6/2001 |
| JP | 2003060530 | 2/2003 |
| JP | 2003087890 | 3/2003 |
| JP | 2004349806 | 12/2004 |
| JP | 2004537232 | 12/2004 |
| JP | 2005323084 | 11/2005 |
| JP | 2006067127 | 3/2006 |
| JP | 2006094389 | 4/2006 |
| JP | 2006101499 | 4/2006 |
| JP | 2006148330 | 6/2006 |
| JP | 4120646 | 8/2006 |
| JP | 4258472 | 8/2006 |
| JP | 4196956 | 9/2006 |
| JP | 2006340151 | 12/2006 |
| JP | 4760160 | 1/2007 |
| JP | 4752403 | 3/2007 |
| JP | 2007089058 | 4/2007 |
| JP | 4867579 | 6/2007 |
| JP | 2007208503 | 8/2007 |
| JP | 2007228069 | 9/2007 |
| JP | 2007228070 | 9/2007 |
| JP | 2007274131 | 10/2007 |
| JP | 2007274463 | 10/2007 |
| JP | 2007288679 | 11/2007 |
| JP | 2008005347 | 1/2008 |
| JP | 2008042754 | 2/2008 |
| JP | 2008154056 | 7/2008 |
| JP | 2008259022 | 10/2008 |
| JP | 2008263336 | 10/2008 |
| JP | 2008312002 | 12/2008 |
| JP | 2009206671 | 9/2009 |
| JP | 2010028653 | 2/2010 |
| JP | 2010114554 | 5/2010 |
| JP | 2010268129 | 11/2010 |
| JP | 2011015018 | 1/2011 |
| JP | 4779748 | 9/2011 |
| JP | 2012165189 | 8/2012 |
| JP | 5028944 | 9/2012 |
| JP | 5139111 | 2/2013 |

(56) References Cited

FOREIGN PATENT DOCUMENTS

| | | |
|---|---|---|
| JP | 5306565 | 10/2013 |
| JP | 5685173 | 3/2015 |
| JP | 2016051038 | 4/2016 |
| KR | 100298300 | 5/2001 |
| KR | 20040083109 | 1/2004 |
| KR | 100901464 | 6/2009 |
| KR | 100960781 | 6/2010 |
| KR | 1020130033723 | 4/2013 |
| KR | 300856915 | 5/2016 |
| TW | 201331932 | 8/2013 |
| TW | I484478 | 5/2015 |
| WO | 1997008896 | 3/1997 |
| WO | 1998047291 | 10/1998 |
| WO | 2000030402 | 5/2000 |
| WO | 2003073786 | 9/2003 |
| WO | 2003088429 | 10/2003 |
| WO | 2004027754 | 4/2004 |
| WO | 2004090865 | 10/2004 |
| WO | 2006049260 | 5/2006 |
| WO | 2006071119 | 7/2006 |
| WO | 2006114015 | 11/2006 |
| WO | 2006121896 | 11/2006 |
| WO | 2007045971 | 4/2007 |
| WO | 2008074249 | 6/2008 |
| WO | 2008125523 | 10/2008 |
| WO | 2009039783 | 4/2009 |
| WO | 2009109069 | 9/2009 |
| WO | 2010001508 | 1/2010 |
| WO | 2010091999 | 8/2010 |
| WO | 2010140084 | 12/2010 |
| WO | 2010144148 | 12/2010 |
| WO | 2011104501 | 9/2011 |
| WO | 2012122132 | 9/2012 |
| WO | 2012140435 | 10/2012 |
| WO | 2012160459 | 11/2012 |
| WO | 2012174159 | 12/2012 |
| WO | 2013016986 | 2/2013 |
| WO | 2013182118 | 12/2013 |
| WO | 2014156292 | 10/2014 |
| WO | 2016176429 | 11/2016 |
| WO | 2016179211 | 11/2016 |
| WO | 2017208022 | 12/2017 |
| WO | 2018140444 | 8/2018 |
| WO | 2018140618 | 8/2018 |
| WO | 2018211806 | 11/2018 |
| WO | 2019231630 | 12/2019 |
| WO | 2020168873 | 8/2020 |
| WO | 2020191354 | 9/2020 |
| WO | 211843001 | 11/2020 |

OTHER PUBLICATIONS

Eargle, "The Microphone Handbook," Elar Publ. Co., 1st ed., 1981, 4 pp.
Enright, Notes From Logan, June edition of Scanlines, Jun. 2009, 9 pp.
Fan, et al., "Localization Estimation of Sound Source by Microphones Array," Procedia Engineering 7, 2010, pp. 312-317.
Firoozabadi, et al., "Combination of Nested Microphone Array and Subband Processing for Multiple Simultaneous Speaker Localization," 6th International Symposium on Telecommunications, Nov. 2012, pp. 907-912.
Flanagan et al., Autodirective Microphone Systems, Acustica, vol. 73, 1991, pp. 58-71.
Flanagan, et al., "Computer-Steered Microphone Arrays for Sound Transduction in Large Rooms," J. Acoust. Soc. Am. 78 (5), Nov. 1985, pp. 1508-1518.
Fohhn Audio New Generation of Beam Steering Systems Available Now, audioXpress Staff, May 10, 2017, 8 pp.
Fox, et al., "A Subband Hybrid Beamforming for In-Car Speech Enhancement," 20th European Signal rocessing Conference, Aug. 2012, 5 pp.
Frost, III, An Algorithm for Linearly Constrained Adaptive Array Processing, Proc. IEEE, vol. 60, No. 8, Aug. 1972, pp. 926-935.
Gannot et al., Signal Enhancement using Beamforming and Nonstationarity with Applications to Speech, IEEE Trans. on Signal Processing, vol. 49, No. 8, Aug. 2001, pp. 1614-1626.
Gansler et al., A Double-Talk Detector Based on Coherence, IEEE Transactions on Communications, vol. 44, No. 11, Nov. 1996, pp. 1421-1427.
Gazor et al., Robust Adaptive Beamforming via Target Tracking, IEEE Transactions on Signal Processing, vol. 44, No. 6, Jun. 1996, pp. 1589-1593.
Gazor et al., Wideband Multi-Source Beamforming with Adaptive Array Location Calibration and Direction Finding, 1995 International Conference on Acoustics, Speech, and Signal Processing, May 1995, pp. 1904-1907.
Gentner Communications Corp., AP400 Audio Perfect 400 Audioconferencing System Installation & Operation Manual, Nov. 1998, 80 pgs.
Gentner Communications Corp., XAP 800 Audio Conferencing System Installation & Operation Manual, Oct. 2001, 152 pgs.
Gil-Cacho et al., Multi-Microphone Acoustic Echo Cancellation Using Multi-Channel Warped Linear Prediction of Common Acoustical Poles, 18th European Signal Processing Conference, Aug. 2010, pp. 2121-2125.
Giuliani, et al., "Use of Different Microphone Array Configurations for Hands-Free Speech Recognition in Noisy and Reverberant Environment," IRST—Istituto per la Ricerca Scientifica e Tecnologica, Sep. 22, 1997, 4 pp.
Gritton et al., Echo Cancellation Algorithms, IEEE ASSP Magazine, vol. 1, issue 2, Apr. 1984, pp. 30-38.
Hald, et al., "A class of optimal broadband phased array geometries designed for easy construction," 2002 Int'l Congress & Expo. on Noise Control Engineering, Aug. 2002, 6 pp.
Hamalainen, et al., "Acoustic Echo Cancellation for Dynamically Steered Microphone Array Systems," 2007 IEEE Workshop on Applications of Signal Processing to Audio and Acoustics, Oct. 2007, pp. 58-61.
Hayo, Virtual Controls for Real Life, Web page downloaded from https://hayo.io/ on Sep. 18, 2019, 19 pp.
Herbordt et al., A Real-time Acoustic Human-Machine Front-End for Multimedia Applications Integrating Robust Adaptive Beamforrning and Stereophonic Acoustic Echo Cancellation, 7th International Conference on Spoken Language Processing, Sep. 2002, 4 pgs.
Herbordt et al., GSAEC—Acoustic Echo Cancellation embedded into the Generalized Sidelobe Canceller, 10th European Signal Processing Conference, Sep. 2000, 5 pgs.
Herbordt et al., Multichannel Bin-Wise Robust Frequency-Domain Adaptive Filtering and Its Application to Adaptive Beamforming, IEEE Transactions on Audio, Speech, and Language Processing, vol. 15, No. 4, May 2007, pp. 1340-1351.
Herbordt, "Combination of Robust Adaptive Beamforming with Acoustic Echo Cancellation for Acoustic Human/Machine Interfaces," Friedrich-Alexander University, 2003, 293 pgs.
Herbordt, et al., Joint Optimization of LCMV Beamforming and Acoustic Echo Cancellation for Automatic Speech Recognition, IEEE International Conference on Acoustics, Speech, and Signal Processing, Mar. 2005, pp. III-77-III-80.
Holm, "Optimizing Microphone Arrays for use in Conference Halls," Norwegian University of Science and Technology, Jun. 2009, 101 pp.
Huang et al., Immersive Audio Schemes: The Evolution of Multiparty Teleconferencing, IEEE Signal Processing Magazine, Jan. 2011, pp. 20-32.
Iconyx Gen5, Product Overview; Renkus-Heinz, Dec. 24, 2018, 2 pp.
International Search Report and Written Opinion for PCT/US2016/022773 dated Jun. 10, 2016. 13 pages.
International Search Report and Written Opinion for PCT/US2016/029751 dated Nov. 28, 2016, 21 pp.
International Search Report and Written Opinion for PCT/US2018/013155 dated Jun. 8, 2018. 12 pages.
International Search Report and Written Opinion for PCT/US2018/015269 dated Mar. 26, 2018, 12 pp.

(56) References Cited

OTHER PUBLICATIONS

International Search Report and Written Opinion for PCT/US2019/031833 dated Jul. 24, 2019, 16 pp.
International Search Report and Written Opinion for PCT/US2019/033470 dated Jul. 31, 2019, 12 pp.
International Search Report and Written Opinion for PCT/US2019/034692 dated Sep. 10, 2019, 11 pp.
International Search Report and Written Opinion for PCT/US2019/051491 dated Dec. 10, 2019, 13 pp.
International Search Report and Written Opinion for PCT/US2019/051989 dated Jan. 10, 2020, 15 pp.
International Search Report and Written Opinion for PCT/US2020/024063 dated Aug. 31, 2020, 18 pp.
International Search Report and Written Opinion for PCT/US2020/035185 dated Sep. 15, 2020, 11 pp.
International Search Report and Written Opinion for PCT/US2020/058385 dated Mar. 31, 2021, 20 pp.
International Search Report and Written Opinion for PCT/US2021/070625 dated Sep. 17, 2021, 17 pp.
International Search Report and Written Opinion for PCT/US2022/014061 dated May 10, 2022, 14 pp.
International Search Report and Written Opinion for PCT/US2022/045694 dated Mar. 17, 2023, 19 pp.
International Search Report for PCT/US2020/024005 dated Jun. 12, 2020, 12 pp.
InvenSense, "Microphone Array Beamforming," Application Note AN-1140, Dec. 31, 2013, 12 pp.
Invensense, Recommendations for Mounting and Connecting InvenSense MEMS Microphones, Application Note AN-1003, 2013, 11 pp.
Invitation to Pay Additional Fees for PCT/US2022/045694 dated Jan. 24, 2023, 13 pp.
Ishii et al., Investigation on Sound Localization using Multiple Microphone Arrays, Reflection and Spatial Information, Japanese Society for Artificial Intelligence, JSAI Technical Report, SIG-Challenge-B202-11, 2012, pp. 64-69.
Buck, et al., "Self-Calibrating Microphone Arrays for Speech Signal Acquisition: A Systematic Approach," Signal Processing, vol. 86, 2006, pp. 1230-1238.
Burton, et al., "A New Structure for Combining Echo Cancellation and Beamforming in Changing Acoustical Environments," IEEE International Conference on Acoustics, Speech and Signal Processing, 2007, pp. 1-77-1-80.
BZ-3a Installation Instructions, Xedit Corporation, Available at <chrome-extension://efaidnbmnnnibpcajpcglclefindmkaj/viewer.html?pdfurl=https%3A%2F%2Fwww.servoreelers.com%2Fmt-content%2Fuploads%2F2017%2F05%2Fbz-a-3universal-2017c.pdf&clen=189067&chunk=true>, 1 p.
Cabral, et al., Glottal Spectral Separation for Speech Synthesis, IEEE Journal of Selected Topics in Signal Processing, 2013, 15 pp.
Campbell, "Adaptive Beamforming Using a Microphone Array for Hands-Free Telephony," Virginia Polytechnic Institute and State University, Feb. 1999, 154 pgs.
Canetto, et al., "Speech Enhancement Systems Based on Microphone Arrays," VI Conference of the Italian Society for Applied and Industrial Mathematics, May 27, 2002, 9 pp.
Cao, "Survey on Acoustic Vector Sensor and its Applications in Signal Processing" Proceedings of the 33rd Chinese Control Conference, Jul. 2014, 17 pp.
Cech, et al., "Active-Speaker Detection and Localization with Microphones and Cameras Embedded into a Robotic Head," IEEE-RAS International Conference on Humanoid Robots, Oct. 2013, pp. 203-210.
Chan, et al., "Uniform Concentric Circular Arrays with Frequency-Invariant Characteristics—Theory, Design, Adaptive Beamforming and DOA Estimation," IEEE Transactions on Signal Processing, vol. 55, No. 1, Jan. 2007, pp. 165-177.
Chau, et al., "A Subband Beamformer on an Ultra Low-Power Miniature DSP Platform," 2002 IEEE International Conference on Acoustics, Speech, and Signal Processing, 4 pp.
Chen, et al., "A General Approach to the Design and Implementation of Linear Differential Microphone Arrays," Signal and Information Processing Association Annual Summit and Conference, 2013 Asia-Pacific, IEEE, 7 pp.
Chen, et al., "Design and Implementation of Small Microphone Arrays," PowerPoint Presentation, Northwestern Polytechnical University and Institut national de la recherche scientifique, Jan. 1, 2014, 56 pp.
Chen, et al., "Design of Robust Broadband Beamformers with Passband Shaping Characteristics using Tikhonov Regularization," IEEE Transactions on Audio, Speech, and Language Processing, vol. 17, No. 4, May 2009, pp. 565-681.
Chou, "Frequency-Independent Beamformer with Low Response Error," 1995 International Conference on Acoustics, Speech, and Signal Processing, pp. 2995-2998, May 9, 1995, 4 pp.
Chu, "Desktop Mic Array for Teleconferencing," 1995 International Conference on Acoustics, Speech, and Signal Processing, May 1995, pp. 2999-3002.
Circuit Specialists webpage for an aluminum enclosure, available at <https://www.circuitspecialists.com/metal-instrument-enclosure-la7.html?otaid=gpl&gclid=EAlalQobChMI2JTw-Ynm6AlVgbblCh3F4QKuEAkYBiABEgJZMPD_BwE>, 3 pp, 2019.
ClearOne Introduces Ceiling Microphone Array With Built-In Dante Interface, Press Release; GlobeNewswire, Jan. 8, 2019, 2 pp.
ClearOne Launches Second Generation of its Groundbreaking Beamforming Microphone Array, Press Release, Acquire Media, Jun. 1, 2016, 2 pp.
ClearOne to Unveil Beamforming Microphone Array with Adaptive Steering and Next Generation Acoustic Echo Cancellation Technology, Press Release, InfoComm, Jun. 4, 2012, 1 p.
ClearOne, Clearly Speaking Blog, "Advanced Beamforming Microphone Array Technology for Corporate Conferencing Systems," Nov. 11, 2013, 5 pp., http://www.clearone.com/blog/advanced-beamforming-microphone-array-technology-for-corporate-conferencing-systems/.
ClearOne, Beamforming Microphone Array, Mar. 2012, 6 pgs.
ClearOne, Ceiling Microphone Array Installation Manual, Jan. 9, 2012, 20 pgs.
ClearOne, Converge/Converge Pro, Manual, 2008, 51 pp.
ClearOne, Professional Conferencing Microphones, Brochure, Mar. 2015, 3 pp.
Coleman, "Loudspeaker Array Processing for Personal Sound Zone Reproduction," Centre for Vision, Speech and Signal Processing, 2014, 239 pp.
Cook, et al., An Alternative Approach to Interpolated Array Processing for Uniform Circular Arrays, Asia-Pacific Conference on Circuits and Systems, 2002, pp. 411-414.
Cox, et al., "Robust Adaptive Beamforming," IEEE Trans. Acoust., Speech, and Signal Processing, vol. ASSP-35, No. 10, Oct. 1987, pp. 1365-1376.
CTG Audio, Ceiling Microphone CTG CM-01, Jun. 5, 2008, 2 pgs.
CTG Audio, CM-01 & CM-02 Ceiling Microphones Specifications, 2 pgs.
CTG Audio, CM-01 & CM-02 Ceiling Microphones, 2017, 4 pgs.
CTG Audio, CTG FS-400 and RS-800 with "Beamforming" Technology, Datasheet, As early as 2009, 2 pp.
CTG Audio, CTG User Manual for the FS-400/800 Beamforming Mixers, Nov. 2008, 26 pp.
CTG Audio, Expand Your IP Teleconferencing to Full Room Audio, Obtained from website htt. )://www ct audio com/exand-, our-i -teleconforencino-to-ful-room-audio-while-conquennc.1-echo-cancelation-issues Mull, 2014. 3 pages.
CTG Audio, Frequently Asked Questions, As early as 2009, 2 pp.
CTG Audio, Installation Manual and User Guidelines for the Soundman SM 02 System, May 2001, 29 pp.
CTG Audio, Installation Manual, Nov. 21, 2008, 25 pgs.
CTG Audio, Introducing the CTG FS-400 and FS-800 with Beamforming Technology, As early as 2008, 2 pp.
CTG Audio, Meeting the Demand for Ceiling Mics in the Enterprise 5 Best Practices, Brochure, 2012, 9 pp.
CTG Audio, White on White—Introducing the CM-02 Ceiling Microphone, https://ctgaudio.com/white-on-white-introducing-the-cm-02-ceiling-microphone/, Feb. 20, 2014, 3 pgs.

(56) References Cited

OTHER PUBLICATIONS

Dahl et al., Acoustic Echo Cancelling with Microphone Arrays, Research Report 3/95, Univ. of Karlskrona/Ronneby, Apr. 1995, 64 pgs.
Decawave, Application Note: APR001, UWB Regulations, A Summary of Worldwide Telecommunications Regulations governing the use of Ultra-Wideband radio, Version 1.2, 2015, 63 pp.
Desiraju, et al., "Efficient Multi-Channel Acoustic Echo Cancellation Using Constrained Sparse Filter Updates in the Subband Domain," Acoustic Speech Enhancement Research, Sep. 2014, 4 pp.
DiBiase et al., Robust Localization in Reverberent Rooms, in Brandstein, ed., Microphone Arrays: Techniques and Applications, 2001, Springer-Verlag Berlin Heidelberg, pp. 157-180.
Diethorn, "Audio Signal Processing for Next-Generation Multimedia Communication Systems," Chapter 4, 2004, 9 pp.
Digikey webpage for Converta box (last visited Apr. 22, 2020) <https://www.digikey.com/product-detail/en/bud-industries/CU-452-A/377-1969-ND/439257?utm_adgroup=Boxes&utm_source=google&utm_medium=cpc&utm_campaign=Shopping_Boxes%2C%20Enclosures%2C%20Racks_NEW&utm_term=&utm_content=Boxes&gclid=EAlalQobChMI2JTw-Ynm6AIVgbblCh3F4QKuEAkYCSABEgKybPD_BwE>, 3 pp.
Digikey webpage for Pomona Box (last visited Apr. 22, 2020) available at <https://www.digikey.com/product-detail/en/pomonaelectronics/3306/501-2054-ND/736489>, 2 pp.
Digital Wireless Conference System, MCW-D 50, Beyerdynamic Inc., 2009, 18 pp.
Do et al., A Real-Time SRP-PHAT Source Location Implementation using Stochastic Region Contraction (SRC) on a Large-Aperture Microphone Array, 2007 IEEE International Conference on Acoustics, Speech and Signal Processing—ICASSP '07, , Apr. 2007, pp. I-121-I-124.
Dominguez, et al., "Towards an Environmental Measurement Cloud: Delivering Pollution Awareness to the Public," International Journal of Distributed Sensor Networks, vol. 10, Issue 3, Mar. 31, 2014, 17 pp.
Dormehl, "HoloLens concept lets you control your smart home via augmented reality," digitaltrends, Jul. 26, 2016, 12 pp.
Soda et al., Introducing Multiple Microphone Arrays for Enhancing Smart Home Voice Control, The Institute of Electronics, Information and Communication Engineers, Technical Report of IEICE, Jan. 2013, 6 pgs.
Soundweb London Application Guides, BSS Audio, 2010. 120 pgs.
Symetrix, Inc., SymNet Network Audio Solutions Brochure, 2008, 32 pgs.
Tan, et al., "Pitch Detection Algorithm: Autocorrelation Method and AMDF," Department of Computer Engineering, Prince of Songkhla University, Jan. 2003, 6 pp.
Tandon, et al., "An Efficient, Low-Complexity, Normalized LMS Algorithm for Echo Cancellation," 2nd Annual IEEE Northeast Workshop on Circuits and Systems, Jun. 2004, pp. 161-164.
Tetelbaum et al., Design and Implementation of a Conference Phone Based on Microphone Array Technology, Proc. Global Signal Processing Conference and Expo (GSPx), Sep. 2004, 6 pgs.
Tiete et al., SoundCompass: A Distributed MEMS Microphone Array-Based Sensor for Sound Source Localization, Sensors, Jan. 23, 2014, pp. 1918-1949.
TOA Corp., Ceiling Mount Microphone AN-9001 Operating Instructions, http://www.toaelectronics.com/media/an9001_mt1e.pdf, 1 pg.
Togami, et al., "Subband Beamformer Combined with Time-Frequency ICA for Extraction of Target Source Under Reverberant Environments," 17th European Signal Processing Conference, Aug. 2009, 5 pp.
U.S. Appl. No. 16/598,918, filed Oct. 10, 2019, 50 pp.
Van Compernolle, Switching Adaptive Filters for Enhancing Noisy and Reverberant Speech from Microphone Array Recordings, Proc. IEEE Int. Conf. on Acoustics, Speech, and Signal Processing, Apr. 1990, pp. 833-836.
Van Trees, Optimum Array Processing: Part IV of Detection, Estimation, and Modulation Theory, 2002, 54 pgs., pp. i-xxv, 90-95, 201-230.
Van Veen et al., Beamforming: A Versatile Approach to Spatial Filtering, IEEE ASSP Magazine, vol. 5, issue 2, Apr. 1988, pp. 4-24.
Vicente, "Adaptive Array Signal Processing Using the Concentric Ring Array and the Spherical Array," Ph.D. Dissertation, University of Missouri, May 2009, 226 pp.
Wang et al., Combining Superdirective Beamforming and Frequency-Domain Blind Source Separation for Highly Reverberant Signals, EURASIP Journal on Audio, Speech, and Music Processing, vol. 2010, pp. 1-13.
Warsitz, et al., "Blind Acoustic Beamforming Based on Generalized Eigenvalue Decomposition," IEEE Transactions on Audio, Speech and Language Processing, vol. 15, No. 5, 2007, 11 pp.
Weinstein, et al., "Loud: A 1020-Node Microphone Array and Acoustic Beamformer," 14th International Congress on Sound & Vibration, Jul. 2007, 8 pgs.
Weinstein, et al., "Loud: A 1020-Node Modular Microphone Array and Beamformer for Intelligent Computing Spaces," MIT Computer Science and Artifical Intelligence Laboratory, 2004, 18 pp.
Wung, "A System Approach to Multi-Channel Acoustic Echo Cancellation and Residual Echo Suppression for Robust Hands-Free Teleconferencing," Georgia Institute of Technology, May 2015, 167 pp.
XAP Audio Conferencing Brochure, ClearOne Communications, Inc., 2002. 78 pages.
Yamaha Corp., MRX7-D Signal Processor Product Specifications, 2016, 12 pgs.
Yamaha Corp., PJP-100H IP Audio Conference System Owner's Manual, Sep. 2006, 59 pgs.
Yamaha Corp., PJP-EC200 Conference Echo Canceller Brochure, Oct. 2009, 2 pgs.
Yan et al., Convex Optimization Based Time-Domain Broadband Beamforming with Sidelobe Control, Journal of the Acoustical Society of America, vol. 121, No. 1, Jan. 2007, pp. 46-49.
Yensen et al., Synthetic Stereo Acoustic Echo Cancellation Structure with Microphone Array Beamforming for VOIP Conferences, 2000 IEEE International Conference on Acoustics, Speech, and Signal Processing, Jun. 2000, pp. 817-820.
Yermeche, et al., "Real-Time DSP Implementation of a Subband Beamforming Algorithm for Dual Microphone Speech Enhancement," 2007 IEEE International Symposium on Circuits and Systems, 4 pp.
Zavarehei, et al., "Interpolation of Lost Speech Segments Using LP-HNM Model with Codebook Post-Processing," IEEE Transactions on Multimedia, vol. 10, No. 3, Apr. 2008, 10 pp.
Zhang, et al., "F-T-LSTM based Complex Network for Joint Acoustic Echo Cancellation and Speech Enhancement," Audio, Speech and Language Processing Group, Jun. 2021, 5 pp.
Zhang, et al., "Multichannel Acoustic Echo Cancelation in Multiparty Spatial Audio Conferencing with Constrained Kalman Filtering," 11th International Workshop on Acoustic Echo and Noise Control, Sep. 14, 2008, 4 pp.
Zhang, et al., "Selective Frequency Invariant Uniform Circular Broadband Beamformer," EURASIP Journal on Advances in Signal Processing, vol. 2010, pp. 1-11.
Zheng, et al., "Experimental Evaluation of a Nested Microphone Array With Adaptive Noise Cancellers," IEEE Transactions on Instrumentation and Measurement, vol. 53, No. 3, Jun. 2004, 10 pp.
"Philips Hue Bulbs and Wireless Connected Lighting System," Web page https://www.philips-hue.com/en-in, 8 pp, Sep. 23, 2020, retrieved from Internet Archive Wayback Machine, <https://web.archive.org/web/20200923171037/https://www.philips-hue.com/en-in> on Sep. 27, 2021. 8 pages.
"Vsa 2050 II Digitally Steerable Column Speaker," Web page https://www.rcf.it/en_US/products/product-detail/vsa-2050-ii/972389, 15 pages, Dec. 24, 2018.
Advanced Network Devices, IPSCM Ceiling Tile IP Speaker, Feb. 2011, 2 pgs.
Advanced Network Devices, IPSCM Standard 2' by 2' Ceiling Tile Speaker, 2 pgs.

(56) References Cited

OTHER PUBLICATIONS

Affes, et al., "A Signal Subspace Tracking Algorithm for Microphone Array Processing of Speech," IEEE Trans. on Speech and Audio Processing, vol. 5, No. 5, Sep. 1997, pp. 425-437.
Affes, et al., "A Source Subspace Tracking Array of Microphones for Double Talk Situations," 1996 IEEE International Conference on Acoustics, Speech, and Signal Processing Conference Proceedings, May 1996, pp. 909-912.
Affes, et al., "An Algorithm for Multisource Beamforming and Multitarget Tracking," IEEE Trans. on Signal Processing, vol. 44, No. 6, Jun. 1996, pp. 1512-1522.
Affes, et al., "Robust Adaptive Beamforming via LMS-Like Target Tracking," Proceedings of IEEE International Conference on Acoustics, Speech and Signal Processing, Apr. 1994, pp. IV-269-IV-272.
Ahonen, et al, "Directional Analysis of Sound Field with Linear Microphone Array and Applications in Sound Reproduction," Audio Engineering Socity, Convention Paper 7329, May 2008, 11 pp.
Alarifi, et al., "Ultra Wideband Indoor Positioning Technologies: Analysis and Recent Advances," Sensors 2016, vol. 16, No. 707, 36 pp.
Amazon webpage for Metalfab MFLCRFG (last visited Apr. 22, 2020) available at <https://www.amazon.com/RETURN-FILTERGRILLE-Drop-Ceiling/dp/B0064Q9A7I/ref=sr 12?dchild=1&keywords=drop+ceiling+return+air+grille&qid=1585862723&s=hi&sr=1-2>, 11 pp.
Armstrong "Walls" Catalog available at <https://www.armstrongceilings.com/content/dam/armstrongceilings/commercial/north-america/catalogs/armstrong-ceilings-wallsspecifiers-reference.pdf>, 2019, 30 pp.
Armstrong Tectum Ceiling & Wall Panels Catalog available at <https://www.armstrongceilings.com/content/dam/armstrongceilings/commercial/north-america/brochures/tectum-brochure.pdf>, 2019, 16 pp.
Armstrong Woodworks Concealed Catalog available at <https://sweets.construction.com/swts_content_files/3824/442581.pdf>, 2014, 6 pp.
Armstrong Woodworks Walls Catalog available at <https://www.armstrongceilings.com/pdbupimagesclg/220600.pdf/download/data-sheet-woodworks-walls.pdf>, 2019, 2 pp.
Armstrong World Industries, Inc., I-Ceilings Sound Systems Speaker Panels, 2002, 4 pgs.
Armstrong, Acoustical Design: Exposed Structure, available at <https://www.armstrongceilings.com/pdbupimagesclg/217142.pdf/download/acoustical-design-exposed-structurespaces-brochure.pdf>, 2018, 19 pp.
Armstrong, Ceiling Systems, Brochure page for Armstrong Softlook, 1995, 2 pp.
Armstrong, Excerpts from Armstrong 2011-2012 Ceiling Wall Systems Catalog, available at <https://web.archive.org/web/20121116034120/http://www.armstrong.com/commceilingsna/en_us/pdf/ceilings_catalog_screen-2011.pdf>, as early as 2012, 162 pp.
Armstrong, i-Ceilings, Brochure, 2009, 12 pp.
Arnold, et al., "A Directional Acoustic Array Using Silicon Micromachined Piezoresistive Microphones," Journal of the Acoustical Society of America, 113(1), Jan. 2003, 10 pp.
Atlas Sound, I128SYSM IP Compliant Loudspeaker System with Microphone Data Sheet, 2009, 2 pgs.
Atlas Sound, 1'x2' IP Speaker with Micophone for Suspended Ceiling Systems, https://www.atlasied.com/i128sysm, retrieved Oct. 25, 2017, 5 pgs.
Audio Technica, ES945 Omnidirectional Condenser Boundary Microphones, https://eu.audio-technica.com/resources/ES945%20Specifications.pdf, 2007, 1 pg.
Audix Microphones, Audix Introduces Innovative Ceiling Mics, http://audixusa.com/docs_12/latest_news/EFplFkAAkIOtSdolke.shtml, Jun. 2011, 6 pgs.
Audix Microphones, M70 Flush Mount Ceiling Mic, May 2016, 2 pgs.
Automixer Gated, Information Sheet, MIT, Nov. 2019, 9 pp.
AVNetwork, "Top Five Conference Room Mic Myths," Feb. 25, 2015, 14 pp.
Beh, et al., "Combining Acoustic Echo Cancellation and Adaptive Beamforming for Achieving Robust Speech Interface in Mobile Robot," 2008 IEEE/RSJ International Conference on Intelligent Robots and Systems, Sep. 2008, pp. 1693-1698.
Benesty, et al., "A New Class of Doubletalk Detectors Based on Cross-Correlation," IEEE Transactions on Speech and Audio Processing, vol. 8, No. 2, Mar. 2000, pp. 168-172.
Benesty, et al., "Adaptive Algorithms for Mimo Acoustic Echo Cancellation," AI2 Allen Institute for Artifical Intelligence, 2003. 30 pages.
Benesty, et al., "Differential Beamforming," Fundamentals of Signal Enhancement and Array Signal Processing, First Edition, 2017, 39 pp.
Benesty, et al., "Frequency-Domain Adaptive Filtering Revisited, Generalization to the Multi-Channel Case, and Application to Acoustic Echo Cancellation," 2000 IEEE International Conference on Acoustics, Speech, and Signal Processing Proceedings, Jun. 2000, pp. 789-792.
Benesty, et. Al., "Microphone Array Signal Processing," Springer, 2010, 20 pp.
Berkun, et al., "Combined Beamformers for Robust Broadband Regularized Superdirective Beamforming," IEEE/ACM Transactions on Audio, Speech, and Language Processing, vol. 23, No. 5, May 2015, 10 pp.
Beyer Dynamic, Classis BM 32-33-34 DE-EN-FR 2016, 1 pg.
Beyer Dynamic, Classis-BM-33-PZ A1, 2013, 1 pg.
BNO055, Intelligent 9-axis absolute orientation sensor, Data sheet, Bosch, Nov. 2020, 118 pp.
Boyd, et al., Convex Optimization, Mar. 15, 1999, 216 pgs.
Brandstein, et al., "Microphone Arrays: Signal Processing Techniques and Applications," Digital Signal Processing, Springer-Verlag Berlin Heidelberg, 2001, 401 pgs.
Brooks, et al., "A Quantitative Assessment of Group Delay Methods for Identifying Glottal Closures in Voiced Speech," IEEE Transaction on Audio, Speech, and Language Processing, vol. 14, No. 2, Mar. 2006, 11 pp.
Bruel & Kjaer, by J.J. Christensen and J. Hald, Technical Review: Beamforming, No. 1, 2004, 54 pgs.
BSS Audio, Soundweb London Application Guides, 2010, 120 pgs.
Buchner, et al., "An Acoustic Human-Machine Interface with Multi-Channel Sound Reproduction," IEEE Fourth Workshop on Multimedia Signal Processing, Oct. 2001, pp. 359-364.
Buchner, et al., "An Efficient Combination of Multi-Channel Acoustic Echo Cancellation with a Beamforming Microphone Array," International Workshop on Hands-Free Speech Communication (HSC2001), Apr. 2001, pp. 55-58.
Buchner, et al., "Full-Duplex Communication Systems Using Loudspeaker Arrays and Microphone Arrays," IEEE International Conference on Multimedia and Expo, Aug. 2002, pp. 509-512.
Buchner, et al., "Generalized Multichannel Frequency-Domain Adaptive Filtering: Efficient Realization and Application to Hands-Free Speech Communication," Signal Processing 85, 2005, pp. 549-570.
Buchner, et al., "Multichannel Frequency-Domain Adaptive Filtering with Application to Multichannel Acoustic Echo Cancellation," Adaptive Signal Processing, 2003, pp. 95-128.
Buck, "Aspects of First-Order Differential Microphone Arrays in the Presence of Sensor Imperfections," Transactions on Emerging Telecommunications Technologies, 13.2, 2002, 8 pp.
Buck, et al., "First Order Differential Microphone Arrays for Automotive Applications," 7th International Workshop on Acoustic Echo and Noise Control, Darmstadt University of Technology, Sep. 10-13, 2001, 4 pp.
Ito et al., Aerodynamic/Aeroacoustic Testing in Anechoic Closed Test Sections of Low-speed Wind Tunnels, 16th AIAA/CEAS Aeroacoustics Conference, 2010, 11 pgs.
Johansson et al., Robust Acoustic Direction of Arrival Estimation using Root-SRP-PHAT, a Realtime Implementation, IEEE International Conference on Acoustics, Speech, and Signal Processing, Mar. 2005, 4 pgs.

(56) References Cited

OTHER PUBLICATIONS

Johansson, et al., Speaker Localisation using the Far-Field SRP-PHAT in Conference Telephony, 2002 International Symposium on Intelligent Signal Processing and Communication Systems, 5 pgs.
Johnson, et al., "Array Signal Processing: Concepts and Techniques," p. 59, Prentice Hall, 1993, 3 pp.
Julstrom et al., Direction-Sensitive Gating: A New Approach to Automatic Mixing, J. Audio Eng. Soc., vol. 32, No. 7/8, Jul./Aug. 1984, pp. 490-506.
Kahrs, Ed., The Past, Present, and Future of Audio Signal Processing, IEEE Signal Processing Magazine, Sep. 1997, pp. 30-57.
Kallinger et al., Multi-Microphone Residual Echo Estimation, 2003 IEEE International Conference on Acoustics, Speech, and Signal Processing, Apr. 2003, 4 pgs.
Kammeyer, et al., New Aspects of Combining Echo Cancellers with Beamformers, IEEE International Conference on Acoustics, Speech, and Signal Processing, Mar. 2005, pp. III-137-III-140.
Kellermann, A Self-Steering Digital Microphone Array, 1991 International Conference on Acoustics, Speech, and Signal Processing, Apr. 1991, pp. 3581-3584.
Kellermann, Acoustic Echo Cancellation for Beamforming Microphone Arrays, in Brandstein, ed., Microphone Arrays: Techniques and Applications, 2001, Springer-Verlag Berlin Heidelberg, pp. 281-306.
Kellermann, Integrating Acoustic Echo Cancellation with Adaptive Beamforming Microphone Arrays, Forum Acusticum, Berlin, Mar. 1999, pp. 1-4.
Kellermann, Strategies for Combining Acoustic Echo Cancellation and Adaptive Beamforming Microphone Arrays, 1997 IEEE International Conference on Acoustics, Speech, and Signal Processing, Apr. 1997, 4 pgs.
Klegon, "Achieve Invisible Audio with the MXA910 Ceiling Array Microphone," Jun. 27, 2016, 10 pp.
Knapp, et al., The Generalized Correlation Method for Estimation of Time Delay, IEEE Transactions on Acoustics, Speech, and Signal Processing, vol. ASSP-24, No. 4, Aug. 1976, pp. 320-327.
Kobayashi et al., A Hands-Free Unit with Noise Reduction by Using Adaptive Beamformer, IEEE Transactions on Consumer Electronics, vol. 54, No. 1, Feb. 2008, pp. 116-122.
Kobayashi et al., A Microphone Array System with Echo Canceller, Electronics and Communications in Japan, Part 3, vol. 89, No. 10, Feb. 2, 2006, pp. 23-32.
Kolundija, et al., "Baffled circular loudspeaker array with broadband high directivity," 2010 IEEE International Conference on Acoustics, Speech and Signal Processing, Dallas, TX, 2010, pp. 73-76.
Lai, et al., "Design of Robust Steerable Broadband Beamformers with Spiral Arrays and the Farrow Filter Structure," Proc. Intl. Workshop Acoustic Echo Noise Control, 2010, 4 pp.
Lebret, et al., Antenna Array Pattern Synthesis via Convex Cptimization, IEEE Trans. on Signal Processing, vol. 45, No. 3, Mar. 1997, pp. 526-532.
LecNet2 Sound System Design Guide, Lectrosonics, Jun. 2, 2006. 28 pages.
Lectrosonics, LecNet2 Sound System Design Guide, Jun. 2006, 28 pgs.
Lee et al., Multichannel Teleconferencing System with Multispatial Region Acoustic Echo Cancellation, International Workshop on Acoustic Echo and Noise Control (IWAENC2003), Sep. 2003, pp. 51-54.
Li, "Broadband Beamforming and Direction Finding Using Concentric Ring Array," Ph.D. Dissertation, University of Missouri-Columbia, Jul. 2005, 163 pp.
Lindstrom et al., An Improvement of the Two-Path Algorithm Transfer Logic for Acoustic Echo Cancellation, IEEE Transactions on Audio, Speech, and Language Processing, vol. 15, No. 4, May 2007, pp. 1320-1326.
Liu et al., Adaptive Beamforming with Sidelobe Control: A Second-Order Cone Programming Approach, IEEE Signal Proc. Letters, vol. 10, No. 11, Nov. 2003, pp. 331-334.
Liu, et al., "Frequency Invariant Beamforming in Subbands," IEEE Conference on Signals, Systems and Computers, 2004, 5 pp.
Liu, et al., "Wideband Beamforming," Wiley Series on Wireless Communications and Mobile Computing, pp. 143-198, 2010, 297 pp.
Lobo, et al., Applications of Second-Order Cone Programming, Linear Algebra and its Applications 284, 1998, pp. 193-228.
Luo et al., Wideband Beamforming with Broad Nulls of Nested Array, Third Int'l Conf. on Info. Science and Tech., Mar. 23-25, 2013, pp. 1645-1648.
Marquardt et al., A Natural Acoustic Front-End for Interactive TV in the EU-Project DICIT, IEEE Pacific Rim Conference on Communications, Computers and Signal Processing, Aug. 2009, pp. 894-899.
Martin, Small Microphone Arrays with Postfilters for Noise and Acoustic Echo Reduction, in Brandstein, ed., Microphone Arrays: Techniques and Applications, 2001, Springer-Verlag Berlin Heidelberg, pp. 255-279.
Maruo et al., On the Optimal Solutions of Beamformer Assisted Acoustic Echo Cancellers, IEEE Statistical Signal Processing Workshop, 2011, pp. 641-644.
Matheja, et al., "Dynamic Signal Combining for Distributed Microphone Systems in Car Environments," 2011 IEEE International Conference on Acoustics, Speech and Signal Processing, May 22, 2011, 6 pp.
McCowan, Microphone Arrays: A Tutorial, Apr. 2001, 36 pgs.
MFLCRFG Datasheet, Metal_Fab Inc., Sep. 7, 2007, 1 p.
Microphone Array Primer, Shure Question and Answer Page, <https://service.shure.com/s/article/microphone-array-primer?language=en_US>, Jan. 2019, 5 pp.
Milanovic, et al., "Design and Realization of FPGA Platform for Real Time Acoustic Signal Acquisition and Data Processing" 22nd Telecommunications Forum TELFOR, 2014, 6 pp.
Mohammed, A New Adaptive Beamformer for Optimal Acoustic Echo and Noise Cancellation with Less Computational Load, Canadian Conference on Electrical and Computer Engineering, May 2008, pp. 000123-000128.
Mohammed, A New Robust Adaptive Beamformer for Enhancing Speech Corrupted with Colored Noise, AICCSA, Apr. 2008, pp. 508-515.
Mohammed, Real-time Implementation of an efficient RLS Algorithm based on IIR Filter for Acoustic Echo Cancellation, AICCSA, Apr. 2008, pp. 489-494.
Mohan, et al., "Localization of multiple acoustic sources with small arrays using a coherence test," Journal Acoustic Soc Am., 123(4), Apr. 2008, 12 pp.
Moulines, et al., "Pitch-Synchronous Waveform Processing Techniques for Text-to-Speech Synthesis Using Diphones," Speech Communication 9, 1990, 15 pp.
Multichannel Acoustic Echo Cancellation, Obtained from website http://www.buchner-net.com/mcaec.html, Jun. 2011. 3 pages.
Myllyla et al., Adaptive Beamforming Methods for Dynamically Steered Microphone Array Systems, 2008 IEEE International Conference on Acoustics, Speech and Signal Processing, Mar.-Apr. 2008, pp. 305-308.
New Shure Microflex Advance MXA910 Microphone With Intellimix Audio Processing Provides Greater Simplicity, Flexibility, Clarity, Press Release, Jun. 12, 2019, 4 pp.
Nguyen-Ky, et al., "An Improved Error Estimation Algorithm for Stereophonic Acoustic Echo Cancellation Systems," 1st International Conference on Signal Processing and Communication Systems, Dec. 17-19, 2007, 5 pp.
Office Action for Taiwan Patent Application No. 105109900 dated May 5, 2017. 10 pages.
Office Action issued for Japanese Patent Application No. 2015-023781 dated Jun. 20, 2016, 4 pp.
Oh, et al., "Hands-Free Voice Communication in an Automobile With a Microphone Array," 1992 IEEE International Conference on Acoustics, Speech, and Signal Processing, Mar. 1992, pp. I-281-I-284.
Olszewski, et al., "Steerable Highly Directional Audio Beam Loudspeaker," Interspeech 2005, 4 pp.

(56) References Cited

OTHER PUBLICATIONS

Moazzen, et al., "Efficient Implementation of Broadband Beamformers Using Nested Hexagonal Arrays and Frustum Filters," IEEE Transactions on Signal Processing, vol. 61, No. 19, Oct. 1, 2013, 10 pp.
Omologo, Multi-Microphone Signal Processing for Distant-Speech Interaction, Human Activity and Vision Summer School (HAVSS), Inria Sophia Antipolis, Oct. 3, 2012, 79 pgs.
Order, Conduct of the Proceeding, *Clearone, Inc.* v. *Shure Acquisition Holdings, Inc.*, Nov. 2, 2020, 10 pp.
Pados et al., An Iterative Algorithm for the Computation of the MVDR Filter, IEEE Trans. on Signal Processing, vol. 49, No. 2, Feb. 2001, pp. 290-300.
Palladino, "This App Lets You Control Your Smarthome Lights via Augmented Reality," Next Reality Mobile AR News, Jul. 2, 2018, 5 pp.
Parikh, et al., "Methods for Mitigating IP Network Packet Loss in Real Time Audio Streaming Applications," GatesAir, 2014, 6 pp.
Pasha, et al., "Clustered Multi-channel Dereverberation for Ad-hoc Microphone Arrays," Proceedings of APSIPA Annual Summit and Conference, Dec. 2015, pp. 274-278.
Petitioner's Motion for Sanctions, *Clearone, Inc.* v. *Shure Acquisition Holdings, Inc.*, Aug. 24, 2020, 20 pp.
Pettersen, "Broadcast Applications for Voice-Activated Microphones," db, Jul./Aug. 1985, 6 pgs.
Pfeifenberger, et al., "Nonlinear Residual Echo Suppression using a Recurrent Neural Network," Interspeech 2020, 5 pp.
Phoenix Audio Technologies, "Beamforming and Microphone Arrays—Common Myths", Apr. 2016, http://info.phnxaudio.com/blog/microphone-arrays-beamforming-myths-1, 19 pp.
Plascore, PCGA-XR1 3003 Aluminum Honeycomb Data Sheet, 2008, 2 pgs.
Polycom Inc., Vortex EF2211/EF2210 Reference Manual, 2003, 66 pgs.
Polycom, Inc., Polycom SoundStructure C16, C12, C8, and SR12 Design Guide, Nov. 2013, 743 pgs.
Polycom, Inc., Setting up the Polycom HDX Ceiling Microphone Array Series, https://support.polycom.com/content/dam/polycom-support/products/Telepresence-and-Video/HDX%20Series/setup-maintenance/en/hdx_ceiling_microphone_array_setting_up.pdf, 2010, 16 pgs.
Polycom, Inc., Vortex EF2241 Reference Manual, 2002, 68 pgs.
Polycom, Inc., Vortex EF2280 Reference Manual, 2001, 60 pp.
Pomona, Model 3306, Datasheet, Jun. 9, 1999, 1 p.
Powers, et al., "Proving Adaptive Directional Technology Works: A Review of Studies," The Hearing Review, Apr. 6, 2004, 5 pp.
Prime, et al., "Beamforming Array Optimisation Averaged Sound Source Mapping on a Model Wind Turbine," ResearchGate, Nov. 2014, 10 pp.
Rabinkin et al., Estimation of Wavefront Arrival Delay Using the Cross-Power Spectrum Phase Technique, 132nd Meeting of the Acoustical Society of America, Dec. 1996, pp. 1-10.
Rane Corp., Halogen Acoustic Echo Cancellation Guide, AEC Guide Version 2, Nov. 2013, 16 pgs.
Rao, et al., "Fast LMS/Newton Algorithms for Stereophonic Acoustic Echo Cancelation," IEEE Transactions on Signal Processing, vol. 57, No. 8, Aug. 2009. 12 pages.
Reuven et al., Joint Acoustic Echo Cancellation and Transfer Function GSC in the Frequency Domain, 23rd IEEE Convention of Electrical and Electronics Engineers in Israel, Sep. 2004, pp. 412-415.
Reuven et al., Joint Noise Reduction and Acoustic Echo Cancellation Using the Transfer-Function Generalized Sidelobe Canceller, Speech Communication, vol. 49, 2007, pp. 623-635.
Reuven, et al., "Multichannel Acoustic Echo Cancellation and Noise Reduction in Reverberant Environments Using the Transfer-Function GSC," 2007 IEEE International Conference on Acoustics, Speech and Signal Processing, Apr. 2007, 4 pp.
Ristimaki, Distributed Microphone Array System for Two-Way Audio Communication, Helsinki Univ. of Technology, Master's Thesis, Jun. 15, 2009, 73 pgs.
Rombouts et al., An Integrated Approach to Acoustic Noise and Echo Cancellation, Signal Processing 85, 2005, pp. 849-871.
Sällberg, "Faster Subband Signal Processing," IEEE Signal Processing Magazine, vol. 30, No. 5, Sep. 2013, 6 pp.
Sasaki et al., A Predefined Command Recognition System Using a Ceiling Microphone Array in Noisy Housing Environments, 2008 IEEE/RSJ International Conference on Intelligent Robots and Systems, Sep. 2008, pp. 2178-2184.
Sennheiser, New microphone solutions for ceiling and desk installation, https://en-us.sennheiser.com/news-new-microphone-solutions-for-ceiling-and-desk-installation, Feb. 2011, 2 pgs.
Sennheiser, TeamConnect Ceiling, https://en-us.sennheiser.com/conference-meeting-rooms-teamconnect-ceiling, 2017, 7 pgs.
SerDes, Wikipedia article, last edited on Jun. 25, 2018; retrieved on Jun. 27, 2018, 3 pp., https://en.wikipedia.org/wiki/SerDes.
Sessler, et al., "Directional Transducers," IEEE Transactions on Audio and Electroacoustics, vol. AU-19, No. 1, Mar. 1971, pp. 19-23.
Sessler, et al., "Toroidal Microphones," Journal of Acoustical Society of America, vol. 46, No. 1, 1969, 10 pp.
Shure AMS Update, vol. 1, No. 1, 1983, 2 pgs.
Shure AMS Update, vol. 4, No. 4, 1997, 8 pgs.
Shure Debuts Microflex Advance Ceiling and Table Array Microphones, Press Release, Feb. 9, 2016, 4 pp.
Shure Inc., A910-HCM Hard Ceiling Mount, retrieved from website <http://www.shure.com/en-US/products/accessories/a910hcm> on Jan. 16, 2020, 3 pp.
Shure Inc., Microflex Advance, http://www.shure.com/americas/microflex-advance, 12 pgs.
Shure Inc., MX395 Low Profile Boundary Microphones, 2007, 2 pgs.
Shure Inc., MXA910 Ceiling Array Microphone, http://www.shure.com/americas/products/microphones/microflex-advance/mxa910-ceiling-array-microphone, 7 pgs. 2009-2017.
Shure, MXA910 With IntelliMix, Ceiling Array Microphone, available at <https://www.shure.com/en-US/products/microphones/mxa910>, as early as 2020, 12 pp.
Shure, New MXA910 Variant Now Available, Press Release, Dec. 13, 2019, 5 pp.
Shure, Q&A in Response to Recent Us Court Ruling on Shure MXA910, Available at <https://www.shure.com/en-US/meta/legal/q-and-a-inresponse-to-recent-us-court-ruling-on-shure-mxa910-response>, As early as 2020, 5 pp.
Shure, RK244G Replacement Screen and Grille, Datasheet, 2013, 1 p.
Shure, The Microflex Advance MXA310 Table Array Microphone, Available at <https://www.shure.com/en-US/products/microphones/mxa310>, As early as 2020, 12 pp.
Signal Processor MRX7-D Product Specifications, Yamaha Corporation, 2016. 12 pages.
Silverman et al., Performance of Real-Time Source-Location Estimators for a Large-Aperture Microphone Array, IEEE Transactions on Speech and Audio Processing, vol. 13, No. 4, Jul. 2005, pp. 593-606.
Sinha, Ch. 9: Noise and Echo Cancellation, in Speech Processing in Embedded Systems, Springer, 2010, pp. 127-142.
SM 69 Stereo Microphone, Datasheet, Georg Neumann GmbH, Available at <https://ende.neumann.com/product_files/6552/download>, 1 p.

* cited by examiner

ARRAY MICROPHONE SYSTEM AND METHOD OF ASSEMBLING THE SAME

CROSS-REFERENCE TO RELATED APPLICATIONS

This application is a continuation of U.S. patent application Ser. No. 17/656,929, filed on Mar. 29, 2022, which is a continuation of U.S. patent application Ser. No. 16/598,918, now U.S. Pat. No. 11,310,592, filed on Oct. 10, 2019, which is a continuation of U.S. patent application Ser. No. 15/833,404, filed on Dec. 6, 2017, which is a continuation of U.S. patent application Ser. No. 15/631,310, filed on Jun. 23, 2017, which is a continuation of U.S. patent application Ser. No. 15/403,765, filed on Jan. 11, 2017, which is a continuation of U.S. patent application Ser. No. 14/701,376, filed on Apr. 30, 2015, now U.S. Pat. No. 9,565,493. The contents of each application are fully incorporated herein by reference.

TECHNICAL FIELD

This application generally relates to an array microphone system and method of assembling the same. In particular, this application relates to an array microphone capable of fitting into a ceiling tile of a drop ceiling and providing 360-degree audio pickup with an overall directivity index that is optimized across the voice frequency range.

BACKGROUND

Conferencing environments, such as boardrooms, video conferencing settings, and the like, can involve the use of microphones for capturing sound from audio sources. The audio sources may include human speakers, for example. The captured sound may be disseminated to an audience through speakers in the environment, a telecast, and/or a webcast.

In some environments, the microphones may be placed on a table or lectern near the audio source in order to capture the sound. However, such microphones may be obtrusive or undesirable, due to their size and/or the aesthetics of the environment in which the microphones are being used. In addition, microphones placed on a table can detect undesirable noise, such as pen tapping or paper shuffling. Microphones placed on a table may also be covered or obstructed, such as by paper, cloth, or napkins, so that the sound is not properly or optimally captured.

In other environments, the microphones may include shotgun microphones that are primarily sensitive to sounds in one direction. The shotgun microphones can be located farther away from an audio source and be directed to detect the sound from a particular audio source by pointing the microphone at the area occupied by the audio source. However, it can be difficult and tedious to determine the direction to point a shotgun microphone to optimally detect the sound coming from its audio source. Trial and error may be needed to adjust the position of the shotgun microphone for optimal detection of sound from an audio source. As such, the sound from the audio source may not be ideally detected unless and until the position of the microphone is properly adjusted. And even then, audio detection may be less than optimal if the audio source moves in and out of a pickup range of the microphone (e.g., if the human speaker shifts in his/her seat while speaking).

In some environments, microphones may be mounted to a ceiling or wall of the conference room to free up table space and provide human speakers with the freedom to move around the room, thereby resolving at least some of the above concerns with tabletop and shotgun microphones. Most existing ceiling-mount microphones are configured to be secured directly to the ceiling or hanging from drop-down cables that are mounted to the ceiling. As a result, these products require complex installation and tend to become a permanent fixture. Further, while ceiling microphones may not pick up tabletop noises given their distance from the table, such microphones have their own audio pickup challenges due to a closer proximity to loudspeakers and HVAC systems, a further distance from audio sources, and an increased sensitivity to air motion or white noise.

Accordingly, there is an opportunity for systems that address these concerns. More particularly, there is an opportunity for systems including an array microphone that is unobtrusive, easy to install into an existing environment, and can enable the adjustment of the microphone array to optimally detect sounds from an audio source, e.g., a human speaker, and reject unwanted noise and reflections.

SUMMARY

The invention is intended to solve the above-noted problems by providing systems and methods that are designed to, among other things: (1) provide an array microphone assembly that is sized and shaped to be mountable in a drop ceiling in place of a ceiling tile; and (2) provide an array microphone system comprising a concentric configuration of microphones that achieves improved directional sensitivity over the voice frequency range and an optimal main to side lobe ratio over a prescribed steering angle range.

In an embodiment, an array microphone system comprises a substrate and a plurality of microphones arranged, on the substrate, in a number of concentric, nested rings of varying sizes. In said embodiment, each ring comprises a subset of the plurality of microphones positioned at predetermined intervals along a circumference of the ring.

In another embodiment, a microphone assembly comprises an array microphone comprising a plurality of microphones and a housing configured to support the array microphone. In said embodiment, the housing is sized and shaped to be mountable in a drop ceiling in place of at least one of a plurality of ceiling tiles included in the drop ceiling. Further, a front face of the housing includes a sound-permeable screen having a size and shape that is substantially similar to the at least one of the plurality of ceiling tiles.

In another embodiment, a method of assembling an array microphone comprises arranging a first plurality of microphones to form a first configuration on a substrate and arranging a second plurality of microphones to form a second configuration on the substrate, where the second configuration concentrically surrounds the first configuration. The method further comprises electrically coupling each of the first and second pluralities of microphones to an audio processor for processing audio signals captured by the microphones.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
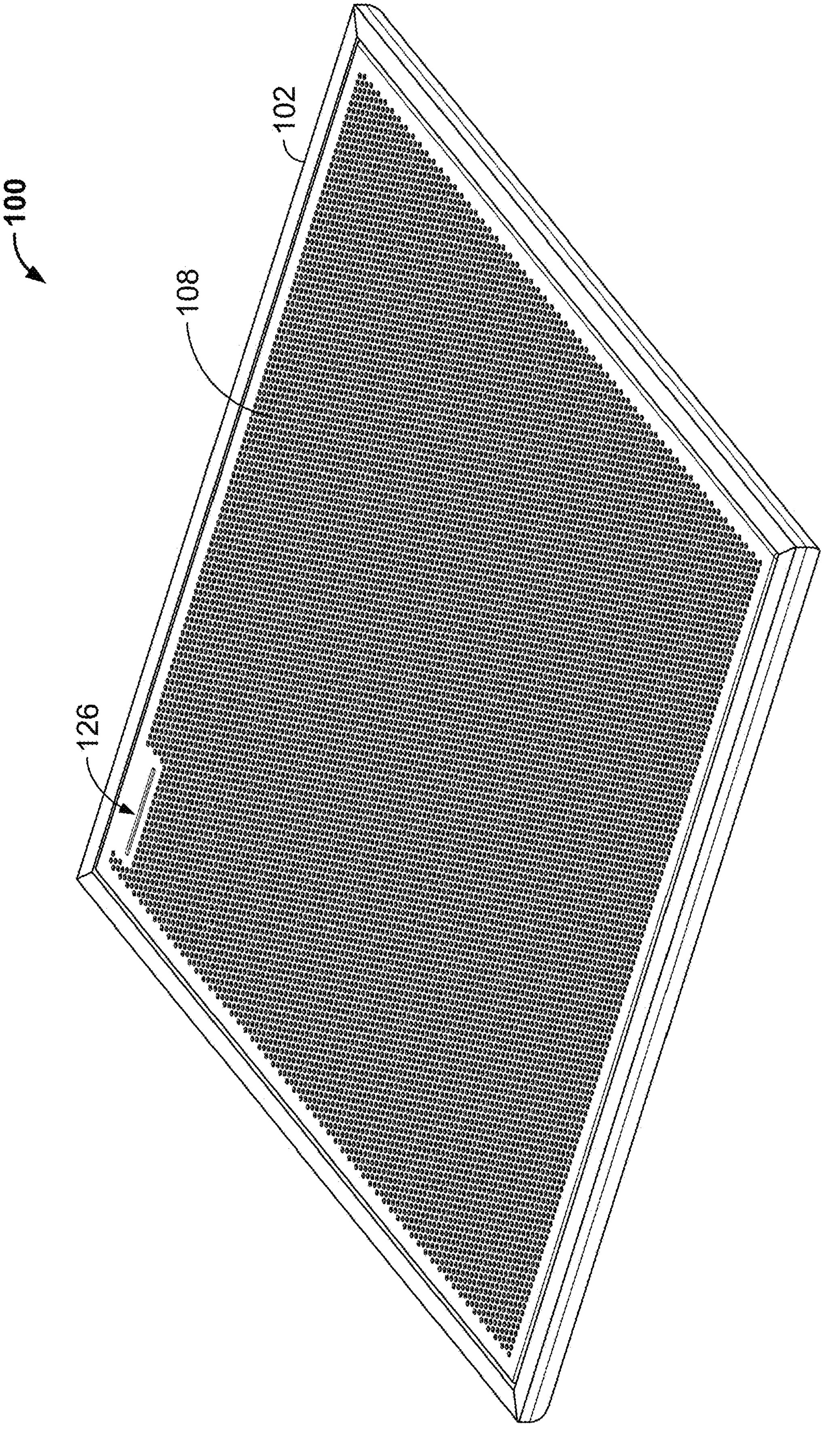
FIG. 1 is a front perspective view of an exemplary array microphone assembly in accordance with certain embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

With respect to the exemplary systems, components and architecture described and illustrated herein, it should also be understood that the embodiments may be embodied by, or employed in, numerous configurations and components, including one or more systems, hardware, software, or firmware configurations or components, or any combination thereof, as understood by one of ordinary skill in the art. Accordingly, while the drawings illustrate exemplary systems including components for one or more of the embodiments contemplated herein, it should be understood that with respect to each embodiment, one or more components may not be present or necessary in the system.

Systems and methods are provided herein for an array microphone assembly that (1) is configured to be mountable in a drop ceiling of, for example, a conferencing or boardroom environment, in place of an existing ceiling panel, and (2) includes a plurality of microphone transducers selectively positioned in a self-similar or fractal-like configuration, or constellation, to create a high performance array with, for example, an optimal directivity index and a maximal main-to-side-lobe ratio. In embodiments, this physical configuration can be achieved by arranging the microphones in concentric rings, which allows the array microphone to have equivalent beamwidth performance at any given look angle in a three-dimensional (e.g., X-Y-Z) space. As a result, the array microphone described herein can provide a more consistent output than array microphones with linear, rectangular, or square constellations. Further, each concentric ring within the constellation of microphones can have a slight, rotational offset from every other ring in order to minimize side lobe growth, giving the array microphone lower side lobes than existing arrays with co-linearly positioned elements. This offset configuration can also tolerate further beam steering, which allows the array to cover a wider pick up area. Moreover, the microphone constellation can be harmonically nested to optimize beamwidth over a given set of distinct frequency bands.

In embodiments, the array microphone may be able to achieve maximal side lobe rejection across the voice frequency range and over a broad range of array focus (e.g., look) angles due, at least in part, to the use of micro-electrical mechanical system (MEMS) microphones, which allows for a greater microphone density and improved rejection of vibrational noise, as compared to existing arrays. The microphone density of the array constellation can permit varying beamwidth control, whereas existing arrays are limited to a fixed beamwidth. In other embodiments, the microphone system can be implemented using alternate transduction schemes (e.g., condenser, balanced armature, etc.), provided the microphone density is maintained.

Figure 2:
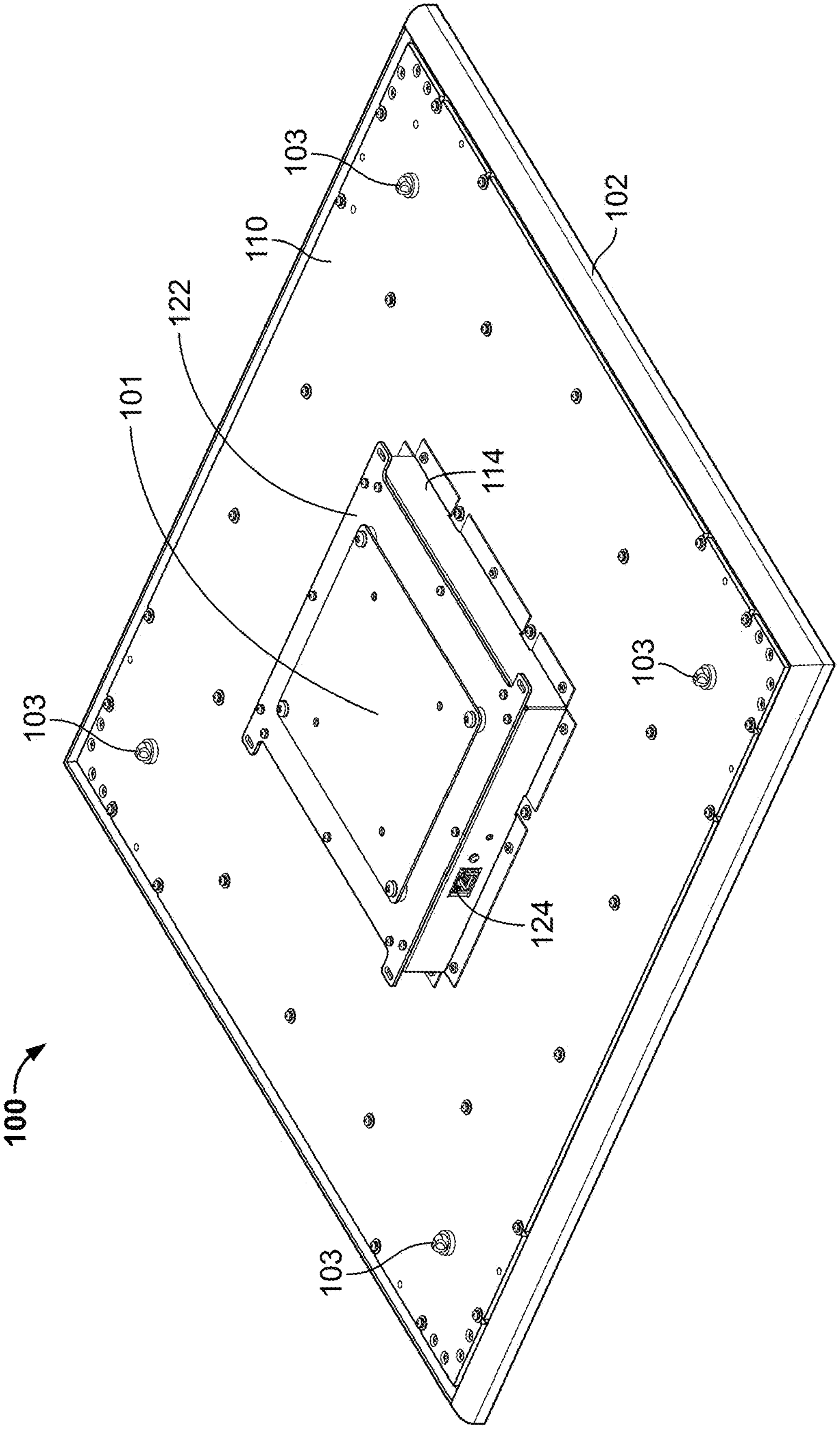
FIG. 2 is a rear perspective view of the array microphone assembly of FIG. 1 in accordance with certain embodiments.
Figure 3:
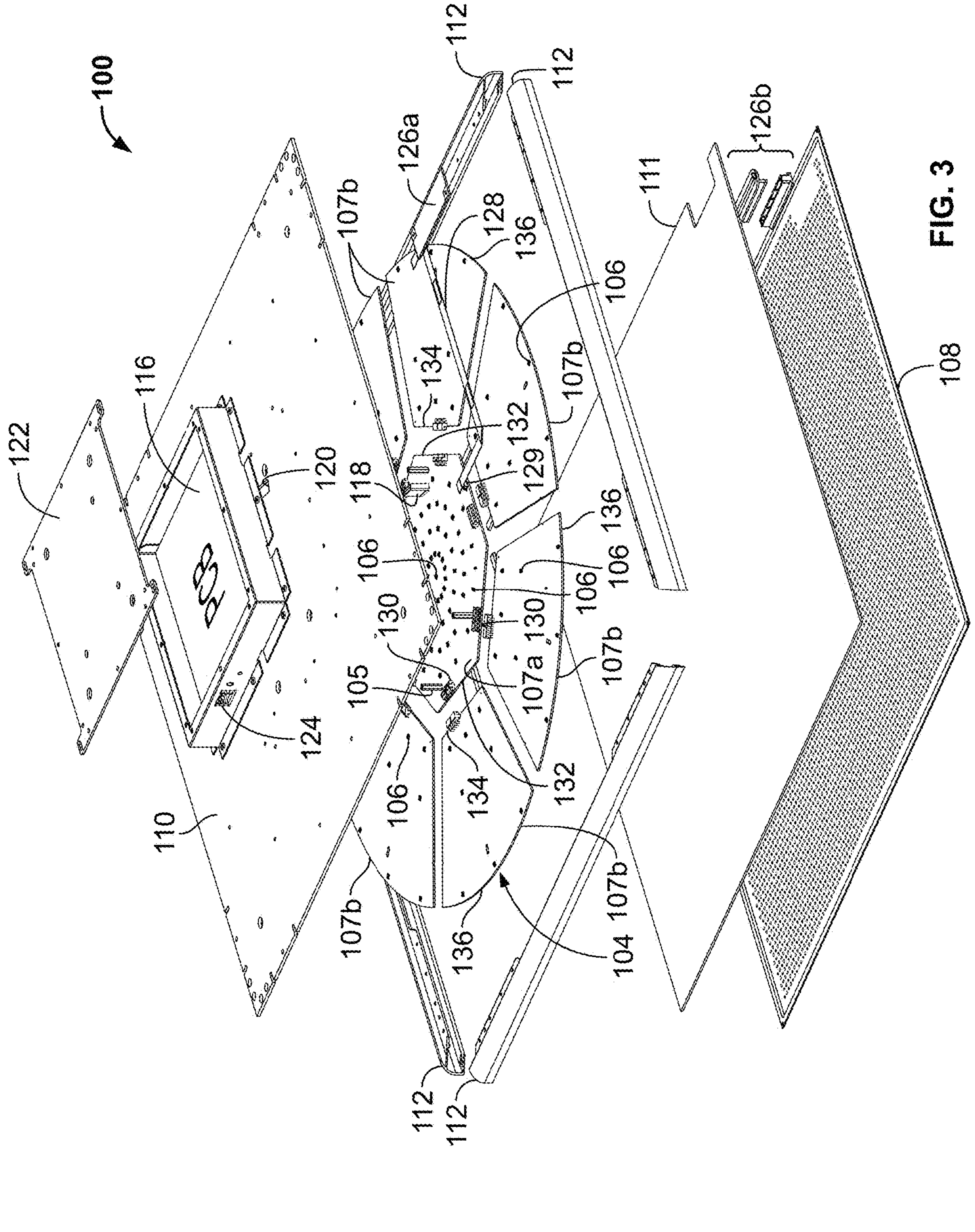
FIG. 3 is an exploded view of the array microphone assembly of FIG. 1 in accordance with certain embodiments.
Figure 4:
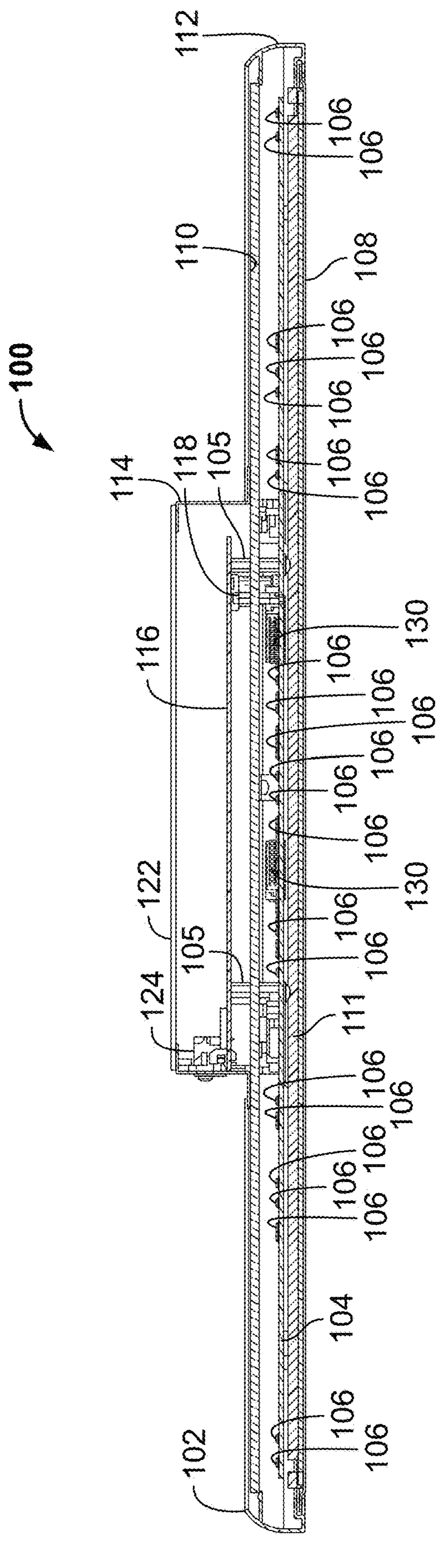
FIG. 4 is a side cross-sectional view of the array microphone assembly of FIG. 3 in accordance with certain embodiments.
Figure 5:
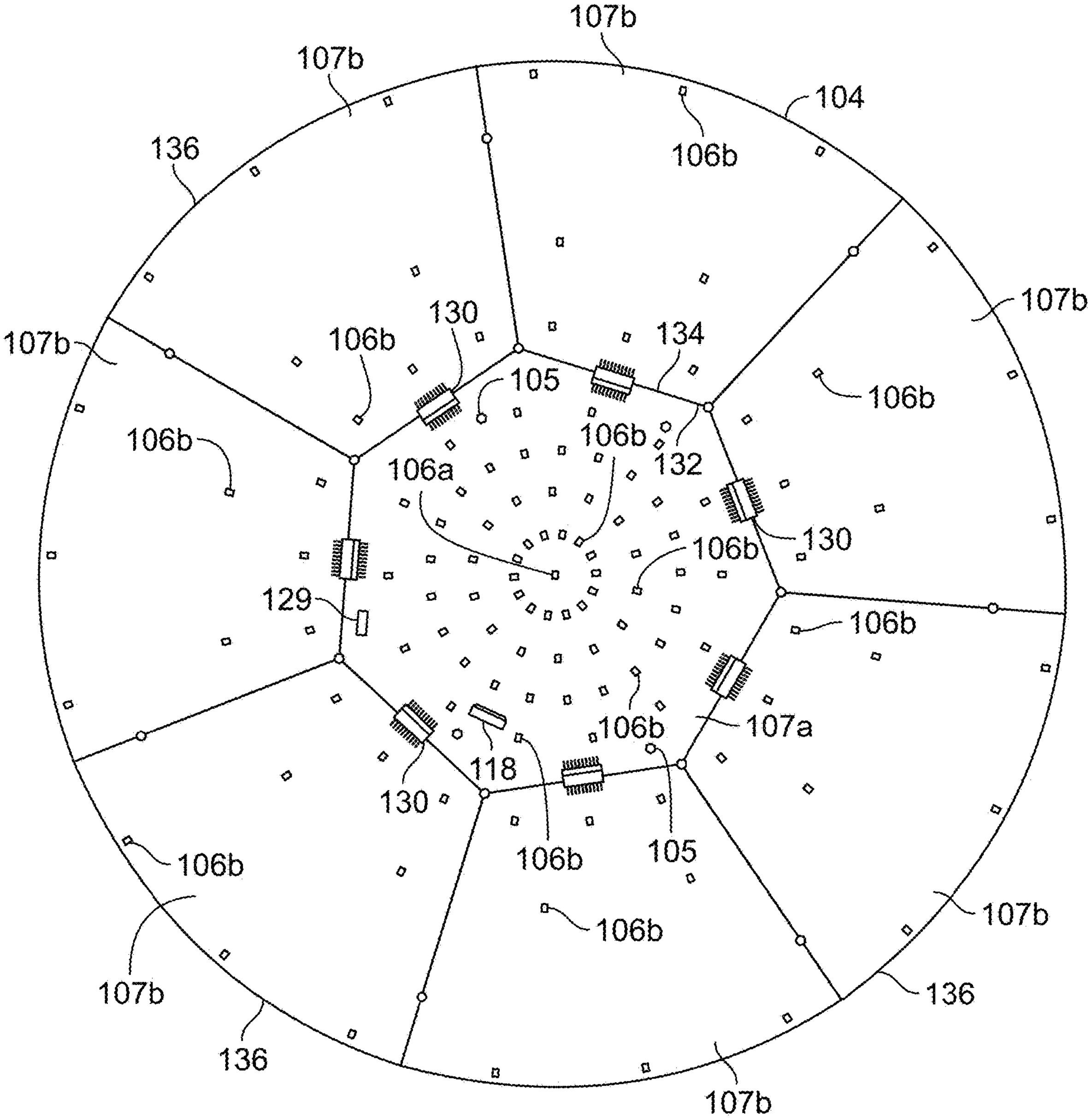
FIG. 5 is a top plan view of the array microphone included in the array microphone assembly of FIG. 3 in accordance with certain embodiments.

FIGS. 1-5 illustrate an exemplary microphone array assembly 100 comprising a housing 102 and an array microphone 104, in accordance with embodiments. More specifically, FIG. 1 depicts a front perspective view of the microphone array assembly 100, FIG. 2 depicts a rear perspective view of the microphone array assembly 100, FIG. 3 depicts an exploded view of the microphone array assembly 100, showing various components of the housing 102 and the microphone array 104 included therein, FIG. 4 depicts a side cross-sectional view of the microphone array assembly 100, and FIG. 5 depicts the microphone array 104, in accordance with embodiments. For the sake of simplicity and illustration, several structural support elements, such as, e.g., screws, washers, rear mounting plate 101, and cable mounting hooks 103, standoffs 105, have been at least partially removed from select views, such as, e.g., FIGS. 3-5.

The array microphone 104 (also referred to herein as "microphone array") comprises a plurality of microphone transducers 106 (also referred to herein as "microphones") configured to detect and capture sounds in an environment, such as, for example, speech spoken by speakers sitting in chairs around a conference table. The sounds travel from the audio sources (e.g., human speakers) to the microphones 106. In some embodiments, the microphones 106 may be unidirectional microphones that are primarily sensitive in one direction. In other embodiments, the microphones 106 may have other directionalities or polar patterns, such as cardioid, subcardioid, or omnidirectional, as desired.

The microphones 106 may be any suitable type of transducer that can detect the sound from an audio source and convert the sound to an electrical audio signal. In a preferred embodiment, the microphones 106 are micro-electrical mechanical system (MEMS) microphones. In other embodiments, the microphones 106 may be condenser microphones, balanced armature microphones, electret microphones, dynamic microphones, and/or other types of microphones.

The microphones 106 can be coupled to, or included on, a substrate 107. In the case of MEMS microphones, the substrate 107 may be one or more printed circuit boards (also referred to herein as "microphone PCB"). For example, in FIG. 5, the microphones 106 are surface mounted to the microphone PCB 107 and included in a single plane. In other embodiments, for example, where the microphones 106 are condenser microphones, the substrate 107 may be made of carbon-fiber, or other suitable material.

As shown in FIGS. 1 and 2, the housing 102 is configured to fully encase the microphone array 104 in order to protect and structurally support the array 104. More specifically, a first or front face of the housing 102 includes a sound-permeable screen or grill 108, and a second or rear face of the housing 102 includes a back panel or support 110. As shown in FIG. 1, the screen 108 can have a perforated surface comprising a plurality of small openings, and can be made of aluminum, plastic, wire mesh, or other suitable material. In other embodiments, the screen 108 may have a substantially solid surface made of sound-permeable film or fabric. As shown in FIG. 3, the housing 102 also includes a membrane 111, made of foam or other suitable material, positioned between the screen 108 and the microphone array 104 to protect the microphone array 104 from external elements, as will be appreciated by those skilled in the pertinent art. As also shown in FIG. 3, the housing 102 further includes side rails 112 for securing each side of the back support 110, the foam membrane 111, and the screen 108 together to form the housing 102. The housing 102 may further include standoffs 105 and spacers (not shown) to mechanically support the microphone array 104 away from other components of the housing 102 and/or the assembly 100.

Figure 6:
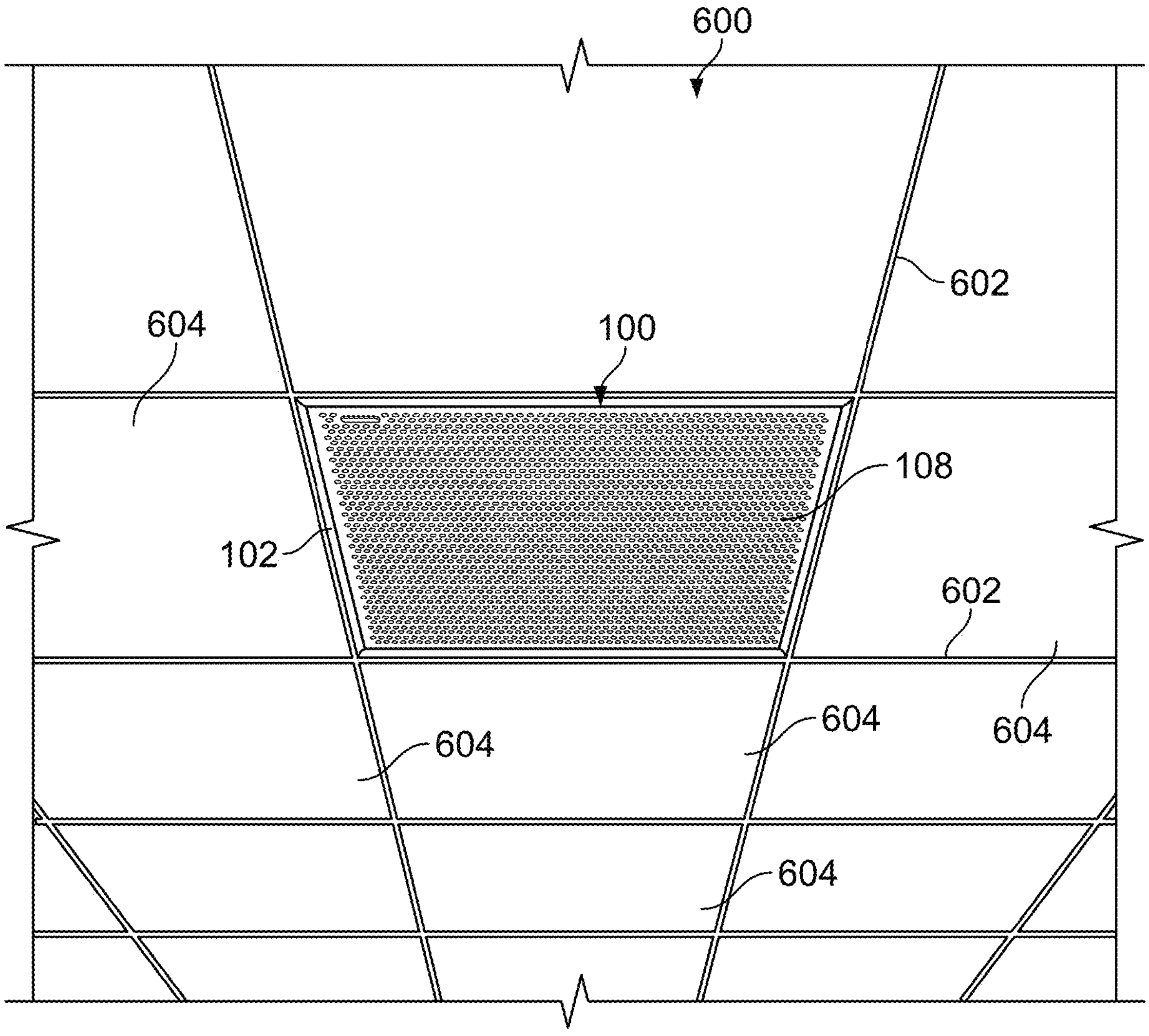
FIG. 6 is an exemplary environment including the array microphone assembly of FIG. 1 in accordance with certain embodiments.

Referring additionally to FIG. 6, shown is an example ceiling 600 with the microphone array assembly 100 installed therein. The ceiling 600 may be part of a conferencing environment, such as, for example, a boardroom where microphones are utilized to capture sound from audio sources or human speakers. In the exemplary environment of FIG. 6, human speakers (not shown) may be seated in chairs at a table below the ceiling 600, or more specifically, below the microphone array assembly 100, although other physical configurations and placements of the audio sources and/or the microphone array assembly 100 are contemplated and possible. In embodiments, the microphone array 104 may be configured for optimal performance at a certain height, or range of heights, above a floor of the environment, for example, in accordance with standard ceiling heights (e.g., eight to ten feet high), or any other appropriate height range.

As shown in FIG. 6, the ceiling 600 may be a drop ceiling (a.k.a. dropped ceiling or suspended ceiling), or a secondary ceiling hung below a main, structural ceiling. As is conventional, the drop ceiling 600 comprises a grid of metal channels 602 that are suspended on wires (not shown) from the main ceiling and form a pattern of regularly spaced cells. Each cell can be filled with a lightweight ceiling tile or panel 604 that, for example, can be removed to provide access for repair or inspection of the area above the tiles. In a preferred embodiment, the ceiling tiles 604 are drop-in tiles that can be easily installed or removed without disturbing the grid or other tiles 604. Each ceiling tile 604 is typically sized and shaped according to a "cell size" of the grid. In the United States, for example, the cell size is typically a square of approximately two feet by two feet, or a rectangle of approximately two feet by four feet. As another example, in Europe, the cell size is typically a square of approximately 600 millimeters (mm) by 600 mm. As yet another example, in Asia, the cell size is typically a square of approximately 625 mm by 625 mm.

In embodiments, the housing 102 can be sized and shaped for installation in the drop ceiling 600 in place of at least one of the ceiling tiles 604. For example, the housing 102 can have length and width dimensions that are substantially equivalent to the cell size of the grid forming the drop ceiling 600. In one embodiment, the housing 102 is substantially square-shaped with dimensions of approximately two feet by two feet (e.g., each of the side rails 112 is about 2 feet long), so that the housing 102 can replace any one of the ceiling tiles 604 in a standard U.S. drop ceiling. In other embodiments, the housing 102 may be sized and shaped to replace two or more of the ceiling tiles 604. For example, the housing 102 may be shaped as an approximately four feet by four feet square to replace any group of four adjoining ceiling tiles 604 that form a square. In other embodiments, the housing 102 can be sized to fit into a standard European drop ceiling (e.g., 600 mm by 600 mm), or a standard Asian drop ceiling (e.g., 625 mm by 625 mm). By mounting the microphone array assembly 100 in place of a ceiling tile 604 of the drop ceiling 600, the assembly 100 can gain acoustic benefits, similar to that of mounting a speaker in a speaker cabinet (such, for example, infinite baffling).

In some cases, an adapter frame (not shown) may be provided to retro-fit or adapt the housing 102 to be compatible with drop ceilings that have a cell size that is larger than the housing 102. For example, the adapter frame may be an aluminum frame that can be coupled around a perimeter of the housing 102 and has a width that extends the dimensions of the housing 102 to fit a predetermined cell size. In such cases, a housing 102 that is sized for standard U.S. ceilings can be adapted to fit, for example, a standard Asian ceiling. In other cases, the housing 102 may be designed to fit a minimum cell size (such as, for example, a 600 mm by 600 mm square), and the adapter frame may be provided in multiple sizes or widths that can extend the dimensions of the housing 102 to fit various different cell sizes (such as, for example, a two feet by two feet square, a 625 mm by 625 mm square, etc.), as needed.

In embodiments, all or portions of the housing 102 may be made of a lightweight, sturdy aluminum or any other material that is light enough to allow the microphone array assembly 100 to be supported by the grid of the drop ceiling 600 and strong enough to enable the housing 102 to support the microphone array 104 mounted therein. For example, in certain embodiments, at least the back panel 110 comprises a flat, aerospace-grade, aluminum board comprising a honeycomb core (e.g., as manufactured by Plascore®). Further, according to certain embodiments, the components of the housing 102 (e.g., the side rails 112, the back portion 110, the screen 108, the microphone array 104, etc.) can be configured to easily fit together for assembly and easily taken apart for disassembly. This feature allows the housing 102 to be customizable according to the end user's specific needs, including, for example, replacing the screen 108 with a different material (e.g., fabric) or color (e.g., to match the color of the ceiling tiles 604); adding or removing an adapter frame to change an overall size of the housing 102, as described above; replacing the side rails 112 to match a color or material of the metal channels 602 in the drop ceiling 600; replacing or adjusting the array microphone 104 (e.g., in order to provide an array with more or fewer microphones 106); etc.

Figure 7:
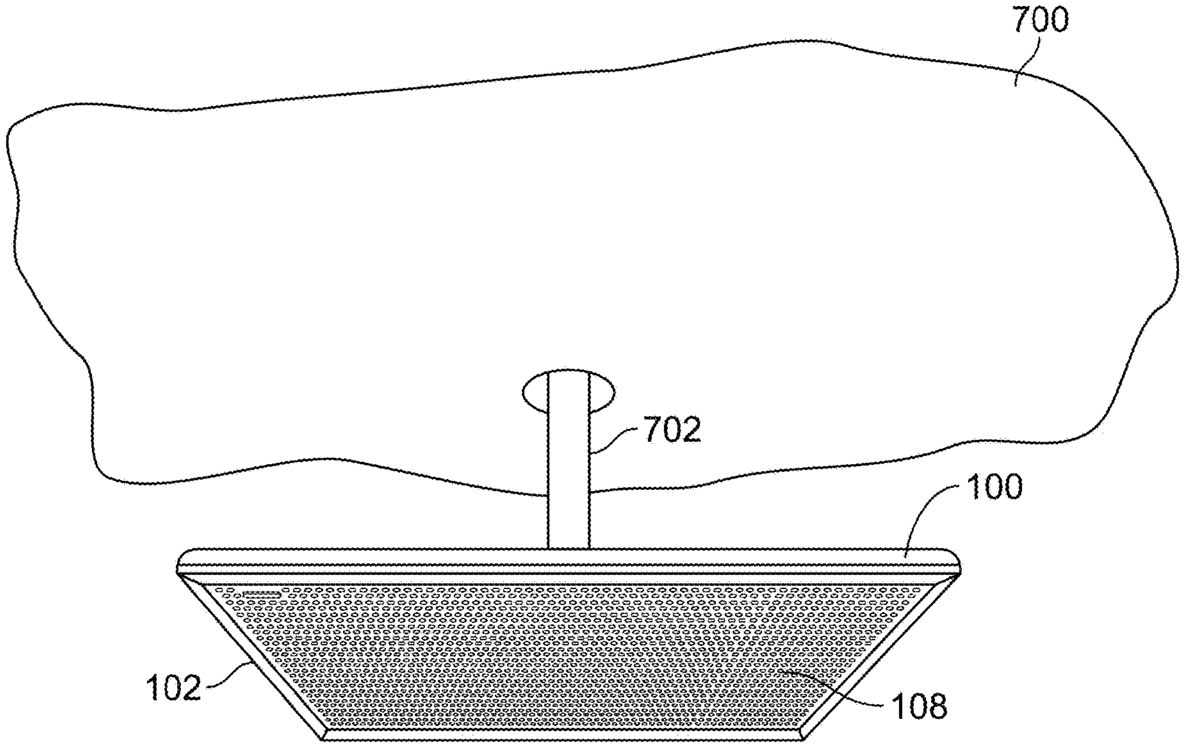
FIG. 7 is another exemplary environment including the array microphone assembly of FIG. 2 in accordance with certain embodiments.
Figure 8:
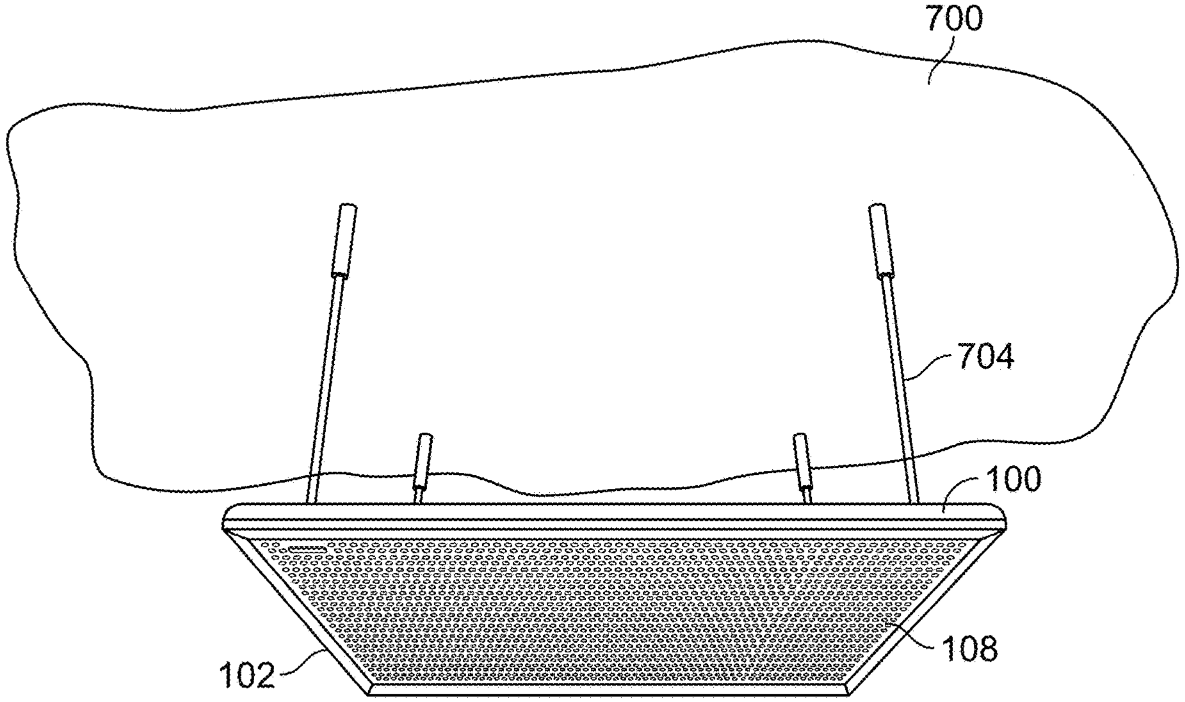
FIG. 8 is another exemplary environment including the array microphone assembly of FIG. 2 in accordance with certain embodiments.

Referring additionally to FIGS. 7 and 8, in embodiments, the housing 102 can be configured to provide alternative mounting options, for example, to accommodate environments that have a ceiling 700 that is not a drop ceiling. In some cases, the microphone array assembly 100 can include the rear mounting plate 101, as shown in FIG. 2. The rear mounting plate 101 can be coupled to a mounting post 702, using a standard VESA mounting hole pattern, the mounting post 702 being configured for attachment to the ceiling 700, as shown in FIG. 7. As shown in FIG. 8, in some cases, the microphone array assembly 100 can be mounted to the ceiling 700 by coupling drop-down ceiling cables 704 to the cable mounting hooks 103 attached to the back support 110 of the housing 102, as shown in FIG. 2. In still other embodiments, the housing 102 can be configured to provide a wall-mounting option and/or for placement in front of a performance area, such as a stage.

Referring now to FIGS. 2-4, the microphone array assembly 100 includes a control box 114 mounted on the back support 110. As shown in FIGS. 3 and 4, the control box 114 houses a printed circuit board 116 (also referred to herein as "audio PCB") that is electrically coupled to the microphone array 104. For example, the audio PCB 116 can be coupled to the microphone array 104, or more specifically, the substrate 107, through a board-to-board connector 118 that extends vertically from the microphone array 104 through an opening 120 in the back support 110, as shown in FIGS. 3 and 4. In embodiments, the audio PCB 116 can be configured as an audio processor (e.g., through hardware and/or software elements) to process audio signals received from and captured by the microphone array 104 and to produce a corresponding audio output, as discussed in more detail herein. As illustrated, the control box 114 can include a removable cover 122 to provide access to the audio PCB 116 and/or other components within the control box 114.

In embodiments, the microphone array assembly 100 includes an external port 124 mechanically coupled to the control box 114 and configured to electrically couple a cable (not shown) to the audio PCB 116. The cable may be a data, audio, and/or power cable, depending on the type of information being conveyed through the port 124. For example, upon coupling the cable thereto, the external port 124 can be configured to receive control signals from an external control device (e.g., an audio mixer, an audio recorder/amplifier, a conferencing processor, a bridge, etc.) and provide the control signals to the audio PCB 116. Further, the port 124 can be configured to transmit or output, to the external control device, audio signals received at the audio PCB 116 from the microphone array 104. In some cases, the external port 124 can be configured to provide power from an external power supply (e.g., a battery, wall outlet, etc.) to the audio PCB 116 and/or the microphone array 104. In a preferred embodiment, the external port 124 is an Ethernet port configured to receive an Ethernet cable (e.g., CAT5, CAT6, etc.) and to provide power, audio, and control connectivity to the microphone array assembly 100. In other embodiments, the external port 124 can include a number of ports and/or can include any other type of data, audio, and/or power port including, for example, a Universal Serial Bus (USB) port, a mini-USB port, a PS/2 port, an HDMI port, a serial port, a VGA port, etc.

Referring now to FIGS. 1 and 3, the microphone array assembly 100 further includes an indicator 126 that visually indicates an operating mode or status of the microphone array 104 (e.g., power on, power off, mute, audio detected, etc.). As shown in FIG. 1, the indicator 126 can be integrated into the screen 108, so that the indicator 126 is visible on an exterior of the front face of the housing 102, to externally indicate the operating mode of the microphone array 104 to human speakers or others in the conferencing environment. In embodiments, the indicator 126 (also referred to herein as "external indicator") comprises at least one light source (not shown), such as, for example, a light emitting diode (LED), that is turned on or off in accordance with an operating mode (e.g., power on or off) of the array microphone assembly 100. In some embodiments, the light indicator 126 can turn on a first light source to indicate a first operating mode (e.g., power on) of the microphone array assembly 100, turn on a second light source to indicate a second operating mode (e.g., audio detected), such that, in some instances, both light sources may be on at the same time. In a preferred embodiment, the indicator 126 includes at least one LED (not shown) mounted to a PCB **126*a* (also referred to herein as "LED PCB") and a light guide 126*b* configured to optically direct the light from the LED to outside the screen 108, as shown in FIG. 3. The LED can be electrically coupled to the microphone array 104 via a cable 128 that connects the LED PCB 126*a* to a connector 129 on the microphone PCB 107, as shown in FIGS. 3 and 5**.

Referring now to FIGS. 3 and 5, in embodiments, the substrate 107 of the microphone array assembly 100 can include a central PCB **107*a* and one or more peripheral PCBs 107*b* positioned around the central board to increase an available space for mounting the microphones 106. For example, a portion of the microphones 106 may be mounted on the central PCB 107*a* and a remainder of the microphones 106 may be mounted on the peripheral PCBs 107*b*, as will be explained in more detail below. Each of the peripheral PCBs 107*b* can be coupled to the central PCB 107*a* using one or more board-to-board connectors 130. In a preferred embodiment, the microphones 106 are all mounted in one plane of the substrate 107, as shown in FIG. 4**.

The number, size, and shape of the one or more peripheral PCBs **107*b* can vary depending on, for example, a number of sides 132, size and/or shape of the central PCB 107*a*, as well as an overall shape of the substrate 107. For example, in the illustrated embodiment, the central PCB 107*a* is a polygon with seven uniform sides 132, and the substrate 107 includes seven peripheral PCBs 107*b* respectively coupled to each side 132 at an inner end 134 of each peripheral PCB 107*b*. As illustrated, the inner ends 134 are flat surfaces uniformly sized to match any one of the seven sides 132. Each peripheral PCB 107*b* can further include an outer end 136 that is opposite the inner end 134. In the illustrated embodiment, the substrate 107 is shaped as a circle, and therefore, the outer end 136 of each peripheral PCB 107*b*** is curved.

In other embodiments, the central PCB **107*a* can have other overall shapes, including, for example, other types of polygons (e.g., square, rectangle, triangle, pentagon, etc.), a circle, or an oval. In such cases, the inner ends 134 of the peripheral PCBs 107***b* may be sized and shaped according to the size and shape of the sides 132 of the central PCB 107*a*. For example, in one embodiment, the central PCB 107 may have a circular shape such that each of the sides 132 is curved, and therefore, the inner ends 134 of the peripheral PCBs 107*b* may also be curved. Likewise, in other embodiments, the substrate 107 can have other overall shapes, including, for example, an oval or a polygon, and the outer ends 136 of the peripheral PCB 107*b* can be shaped accordingly. In still other embodiments, the substrate 107 can include a donut-shaped peripheral PCB 107*b* surrounding a circular central PCB 107*a*, or a single, continuous board 107 comprising all of the microphone transducers 106.

As shown in FIG. 5, in embodiments, the plurality of microphones 106 includes a central microphone 106*a* positioned at a central point of the central PCB 107*a* and a remaining set of the microphones 106*b* that are arranged in a fractal, or self-similar, configuration surrounding the central microphone 106*a* and positioned on either the central PCB 107*a* or the peripheral PCB 107*b*. Due, at least in part, to the fractal-like placement of the microphones 106, the array microphone 104 can achieve improved directional sensitivity across the voice frequency range and maximal main-to-side-lobe ratio over a prescribed steering angle range. As a result, the microphone array 104 can more precisely "listen" for signals coming from a single direction and reject unwanted noise and/or interference sounds, and can more effectively differentiate between adjacent human speakers. In addition, the fractal nature of the microphone configuration allows the directivity of the array 104 to be easily extensible to a wider frequency range (e.g., lower and/or higher frequencies) by adding more microphones and/or creating a larger-sized microphone array 104.

More specifically, in embodiments, the microphones 106 can be arranged in concentric, circular rings of varying sizes, so as to avoid undesired pickup patterns (e.g., due to grating lobes) and accommodate a wide range of audio frequencies. As used herein, the term "ring" may include any type of circular configuration (e.g., perfect circle, near-perfect circle, less than perfect circle, etc.), as well as any type of oval configuration or other oblong loop. As shown in FIG. 5, the rings can be positioned at various radial distances from the central microphone 106*a*, or a central point of the substrate 107, to form a nested configuration that can handle progressively lower audio frequencies, with the outermost ring being configured to optimally operate at the lowest frequencies in the predetermined operating range. Using harmonic nesting techniques, the concentric rings can be used to cover a specific frequency bands within a range of operating frequencies.

In embodiments, each ring contains a different subset of the remaining microphones 106*b*, and each subset of microphones 106*b* can be positioned at predetermined intervals along a circumference of the corresponding ring. The predetermined interval or spacing between neighboring microphones 106*b* within a given ring can depend on a size or diameter of the ring, a number of microphones 106*b* included in the subset assigned to that ring, and/or a desired sensitivity or overall sound pressure for the microphones 106*b* in the ring. Increasing the number of microphones 106 and a microphone density of the rings (e.g., due to nesting of the rings) can help remove grating lobes and thereby, produce an improved beamwidth with a near constant frequency response across all frequencies within the preset range.

As will be appreciated, FIG. 5 only shows an exemplary embodiment of the array microphone 104 and other configurations of the microphones 106 are contemplated in accordance with the principles disclosed herein. For example, in some embodiments, the plurality of microphones 106 may be arranged in concentric rings around a central point, but without any microphone positioned at the central point (e.g., without the central microphone 106*a*). In still other embodiments, only a portion of the microphones 106 may be arranged in concentric rings, and the remaining portion of the microphones 106 may be positioned at various points outside of, or in between, the discrete rings, at random locations on the substrate 107, or in any other suitable arrangement.

Figure 9:
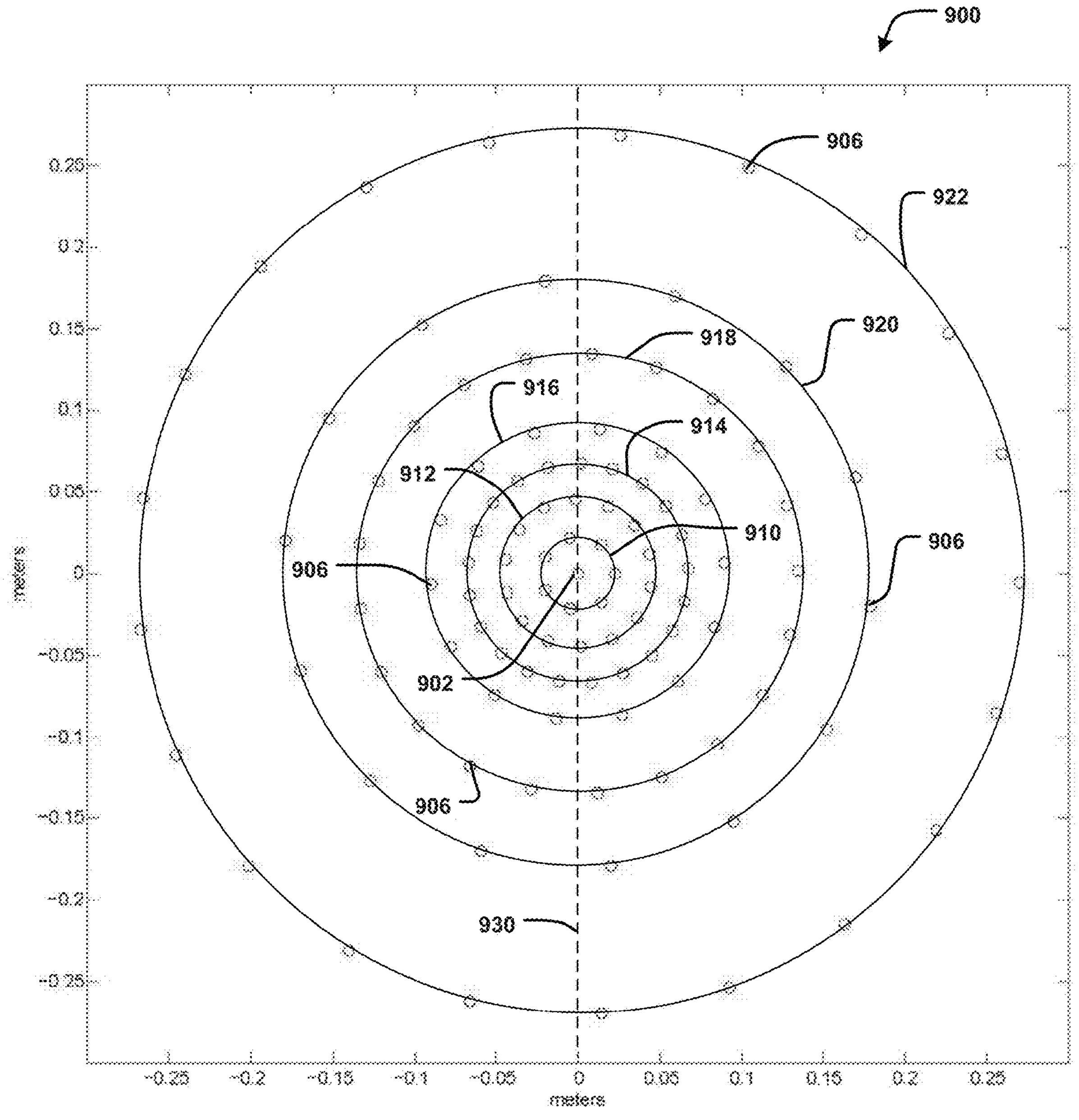
FIG. 9 is a graph showing microphone placement in another example array microphone in accordance with certain embodiments.

FIG. 9 graphically depicts an exemplary microphone configuration 900 that may be found in an array microphone in accordance with certain embodiments. The microphone configuration 900 may be substantially similar to the self-similar configuration of microphones 106 included the microphone array 104, except for the number of microphones 106*b* included in an innermost ring of the array 104. As shown, the microphone configuration 900 includes one microphone 902 (e.g., the central microphone 106*a*) located at a center of the configuration 900 and a plurality of microphones 906 (e.g., the remaining set of microphones 106*b*) arranged in seven concentric rings 910-922. For ease of explanation and illustration, a circle has been drawn through each group of microphones 906 that forms the rings of the microphone configuration 900.

In order to accommodate the microphones 906, the microphone configuration 900 may be mounted on a plurality of printed circuit boards (not shown), similar to the central PCB 107*a* and the plurality of peripheral PCBs 107*b*. For example, referring now to FIG. 5 as well, the microphones 906 may include (i) a first subset of the microphones 906 mounted on the central PCB 107*a* to form a first ring 910 surrounding the central microphone 902, (ii) a second subset of the microphones 906 mounted on the central PCB 107*a* to form a second ring 912 surrounding the first ring 910, (iii) a third subset of the microphones 906 that are mounted on the central PCB 107*a* to form a third ring 914 surrounding the second ring 912, (iv) a fourth subset of the microphones 906 mounted on the central PCB 107*a* to form a fourth ring 916 surrounding the third ring 914, (v) a fifth subset of the microphones 906 mounted on the peripheral PCBs 107*b* to form a fifth ring 918 surrounding the fourth ring 916, (vi) a sixth subset of the microphones 906 mounted on the peripheral PCBs 107*b* to form a sixth ring 920 surrounding the fifth ring 918, and (vii) a seventh subset of the microphones 906 mounted on, and near an edge of, the peripheral PCBs 107*b* to form a seventh ring 922 surrounding the sixth ring 920.

In embodiments, the number of rings 910-922 included in the microphone array, a diameter of each ring, and/or the radial distance between neighboring rings can vary depending on the desired frequency range over which the array microphone is configured to operate and what percentage of that range will be covered by each ring. In embodiments, the diameter of each ring in the microphone array defines the lowest frequency at which the subset of microphones within that ring can operate without picking up unwanted signals (e.g., due to grating lobes). As such, the diameter of the outermost ring 922 can determine a lower end of the operational frequency range of the microphone array, and the remaining ring diameters can be determined by subdividing the remaining frequency range. For example and without limitation, in some embodiments, the microphone array can be configured to cover an operational frequency range of at least 100 hertz (Hz) to at least 10 kilohertz (KHz), with each ring covering, or contributing to coverage of, a different octave or other frequency band within this range. As a further example, in such embodiments, the outermost ring 922 may be configured to cover the lowest frequency band (e.g., 100 Hz), and the remaining rings 910-920, either alone or in combination with one or more other rings, may contribute to coverage of the remaining octaves or bands (e.g., frequency bands starting at 200 Hz, 400 Hz, 800 Hz, 1600 Hz, 3200 Hz, and/or 6400 Hz).

As will be appreciated, side lobes may be present in a polar response of a microphone array, in addition to a main lobe of the array beam, the result of undesired, extraneous pick-up sensitivity at angles other than the desired beam angle. Because side lobes can change in magnitude and frequency sensitivity as the array beam is steered, a beam that typically has very small side lobes relative to a main lobe can have a much larger side lobe response once the beam is steered to a different direction. In some cases, the side lobe sensitivity can even rival the main lobe sensitivity at certain frequencies. However, in embodiments, including more microphones 906 within the microphone array can strengthen the main lobe of a given beam and thereby, reduce the ratio of side lobe sensitivity to main lobe sensitivity.

In embodiments, the rings 910-922 may be at least slightly rotated relative to a central axis 930 that passes through a center of the array (e.g., the central microphone 902) in order to optimize the directivity of the microphone array. In such cases, the microphone array can be configured to constrain microphone sensitivity to the main lobes, thereby maximizing main lobe response and reducing side lobe response. In some embodiments, the rings 910-922 can be rotationally offset from each other, for example, by rotating each ring a different number of degrees, so that no more than any two microphones 906 are axially aligned. For example, in microphone arrays with a smaller number of microphones, this rotational offset may be beneficial to reduce an undesired acoustic signal pickup that can occur when more than two microphones are aligned. In other embodiments, for example, in arrays with a large number of microphones, the rotational offset may be more arbitrarily implemented, if at all, and/or other methods may be utilized to optimize the overall directivity of the microphone array.

Referring back to FIG. 5, in embodiments, each of the peripheral PCBs 107*b* can be uniformly designed to streamline manufacturing and assembly. For example, as shown in FIG. 5, each peripheral PCB 107*b* can have a uniform shape, and the microphones 106*b* can be placed in identical locations on each board 107*b*. In this manner, any one of the peripheral PCBs 107*b* can be coupled to any one of the connectors 130 in order to electrically couple the peripheral PCB 107*b* to the central PCB 107*a*. For example, in the illustrated embodiment, the microphone PCB 107 includes seven peripheral PCBs 107*b* so that each of the peripheral PCBs 107*b* can include eight microphones in uniform locations. The remaining 64 microphones are included on the central PCB 107*a*, so that the microphone array 104 includes a total of 120 microphones.

In embodiments, the total number of microphones 106 and/or the number of microphones 106*b* on the central PCB 107*a* and/or each of the peripheral PCBs 107*b* may vary depending on, for example, the configuration of the harmonic nests, a preset operating frequency range of the array 104, an overall size of the microphone array 104, as well as other considerations. For example, in FIG. 9, the microphone configuration 900 includes only 113 microphones, or more specifically, one central microphone 902 surrounded by 112 microphones 906, because the ring 910 includes seven fewer microphones 906 than the corresponding ring of the microphone array 104 in FIG. 5. In certain embodiments, removing these seven microphones from the first or innermost ring 910 can be achieved with little to no loss in frequency coverage or microphone sensitivity.

In embodiments, the number of microphones 906 included in each of the rings 910-922 can be selected to create a self-similar or repeating pattern in the microphone configuration 900. This can allow the microphone configuration 900 to be easily extended by adding one or more rings, in order to cover more audio frequencies, or easily reduced by removing one or more rings, in order to cover fewer frequencies. For example, in the illustrated embodiments of FIGS. 5 and 9, a fractal or self-similar configuration is formed by placing 7, 14, or 21 microphones 106*b*/906 (e.g., a multiple of 7) in each of the seven rings 910-922. Other embodiments may include other repeatable arrangements of the microphones 106*b*/906, such as, for example, multiples of another integer greater than one, or any other pattern that can simplify manufacturing of the array microphone 104. For example and without limitation, in one embodiment, the number of microphones 906 in each of the inner rings 910-920 may alternate between two numbers (e.g., 8 and 16), while the outermost ring 922 may include any number of microphones 906 (e.g., 20).

As will be appreciated, in other embodiments, the microphones 106/906 may be arranged in other configuration shapes, such as, for example, ovals, squares, rectangles, triangles, pentagons, or other polygons, have more or fewer subsets or rings of microphones 106/906, and/or have a different number of microphones 106/906 in each of the rings 910-922 depending on, for example, a desired distance between each ring, an overall size of the substrate 107, a total number of microphones 106 in the array 104, a preset audio frequency range covered by the array 104, as well as other performance- and/or manufacturing-related considerations.

Figure 10:
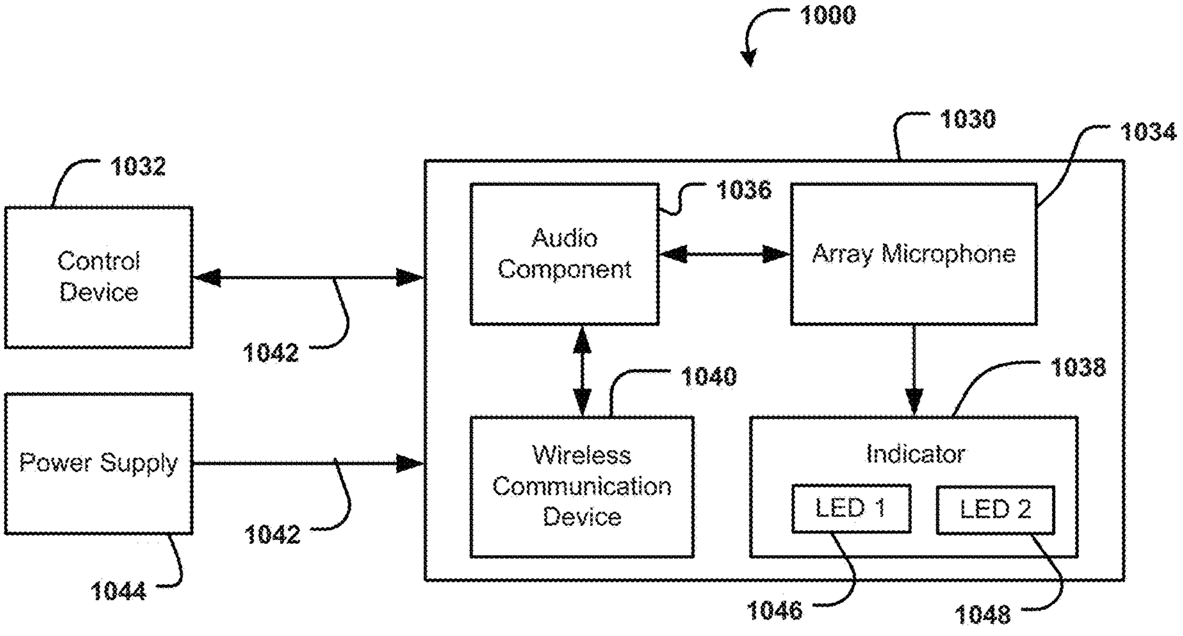
FIG. 10 is a block diagram depicting an example array microphone system in accordance with certain embodiments.

FIG. 10 illustrates a block diagram of an exemplary audio system 1000 comprising an array microphone system 1030 and a control device 1032. The array microphone system 1030 may be configured similar to the array microphone assembly 100 shown in FIGS. 1-5, or in other configurations. For example, the array microphone system 1030 may include an array microphone 1034 that is similar to the array microphone 104. The array microphone system 1030 may also include an audio component 1036 that receives audio signals from the array microphone 1034 and is configured as an audio recorder, audio mixer, amplifier, and/or other component for processing of audio signals captured by the microphone array 1034. In such embodiments, the audio component 1036 may be at least partially included on a printed circuit board (not shown), such as, e.g., the audio PCB 116. In other embodiments, the audio component 1036 is located in the audio system 1000 independently of the array microphone system 1030, and the array microphone system 1030 (e.g., within the control device 1032) may be in wired or wireless communication with the audio component 1036. The array microphone system 1030 may further include an indicator 1038 similar to the indicator 126 to visually indicate an operating mode of the microphone array 1034 on a front exterior of the array microphone system 1030.

The control device 1032 may be in wired or wireless communication with the array microphone system 1030 to control the audio component 1036, the microphone array

1034, and/or the indicator 1038. For example, the control device 1036 may include controls to activate or deactivate the microphone array 1034 and/or the indicator 1038. Controls on the control device 1036 may further enable the adjustment of parameters of the microphone array 1034, such as directionality, gain, noise suppression, pickup pattern, muting, frequency response, etc. In embodiments, the control device 1036 may be a laptop computer, desktop computer, tablet computer, smartphone, proprietary device, and/or other type of electronic device. In other embodiments, the control device 1036 may include one or more switches, dimmer knobs, buttons, and the like.

In some embodiments, the microphone array system 1030 includes a wireless communication device 1040 (e.g., a radio frequency (RF) transmitter and/or receiver) for facilitating wireless communication between the system 1030 and the control device 1036 and/or other computer devices (e.g., by transmitting and/or receiving RF signals). For example, the wireless communication may be in the form of an analog or digital modulated signal and may contain audio signals captured by the microphone array 1034 and/or control signals received from the control device 1036. In some embodiments, the wireless communication device 1040 may include a built-in web server for facilitating web conferencing and other similar features through communication with a remote computer device and/or server.

In some embodiments, the array microphone system 1030 includes an external port (not shown) similar to the external port 124, and the system 1030 is in wired communication with the control device 1036 via a cable 1042 coupled to the port 124. In one such embodiment, the audio system 1000 further includes a power supply 1044 that is also coupled to the array microphone system 1030 via the cable 1042, such that the cable 1042 carries power, control, and/or audio signals between various components of the audio system 1000. In a preferred embodiment, the cable 1042 is an Ethernet cable (e.g., CAT5, CAT6, etc.). In other embodiments, the power supply 1044 is coupled to the array microphone system 1030 via a separate power cable.

As illustrated, the indicator 1038 can include a first light source 1046 and a second light source 1048. The first light source 1046 may be configured to indicate a first operating mode or status of the microphone array 1034 by turning the light on or off, and likewise, the second light source 1048 may be configured to indicate a second operating mode of the microphone array 1034. For example, the first light source 1046 may indicate whether or not the microphone array system 1030 has power (e.g., the light 1046 turns on if the system 1030 is turned on), and the second light source 1048 may indicate whether or not the microphone array 1034 has been muted (e.g., the light 1048 turns on if the system 1030 has been set to a mute setting). In other cases, at least one of the light sources 1046, 1048 may indicate whether or not audio is being received from an outside audio source (e.g., during web conferencing). In a preferred embodiment, the first light source 1046 is a first LED with a first light color, and the second light source 1048 is a second LED with a second light color that is different from the first light color (e.g., blue, green, red, white, etc.). The indicator 1038 can be in electronic communication with and controlled by the control device 1032 and/or the audio component 1036, for example, to determine which operating mode(s) can be indicated by the indicator 1038 and which color(s), LED(s), or other forms of indication are assigned to each operating mode.

In embodiments, the audio component 1036 can be configured (e.g., via computer programming instructions) to enable adjustment of parameters of the microphone array 1034, such as directionality, gain, noise suppression, pickup pattern, muting, frequency response, etc. Further, the audio component 1036 may include an audio mixer (not shown) to enable mixing of the audio signals captured by the microphone array 1034 (e.g., combining, routing, changing, and/or otherwise manipulating the audio signals). The audio mixer may continuously monitor the received audio signals from each microphone in the microphone array 1034, automatically select an appropriate (e.g., best) lobe formed by the microphone array 1034 for a given human speaker, automatically position or steer the selected lobe directly towards the human speaker, and output an audio signal that emphasizes the selected lobe while suppressing signals from the other audio sources.

Figure 11:
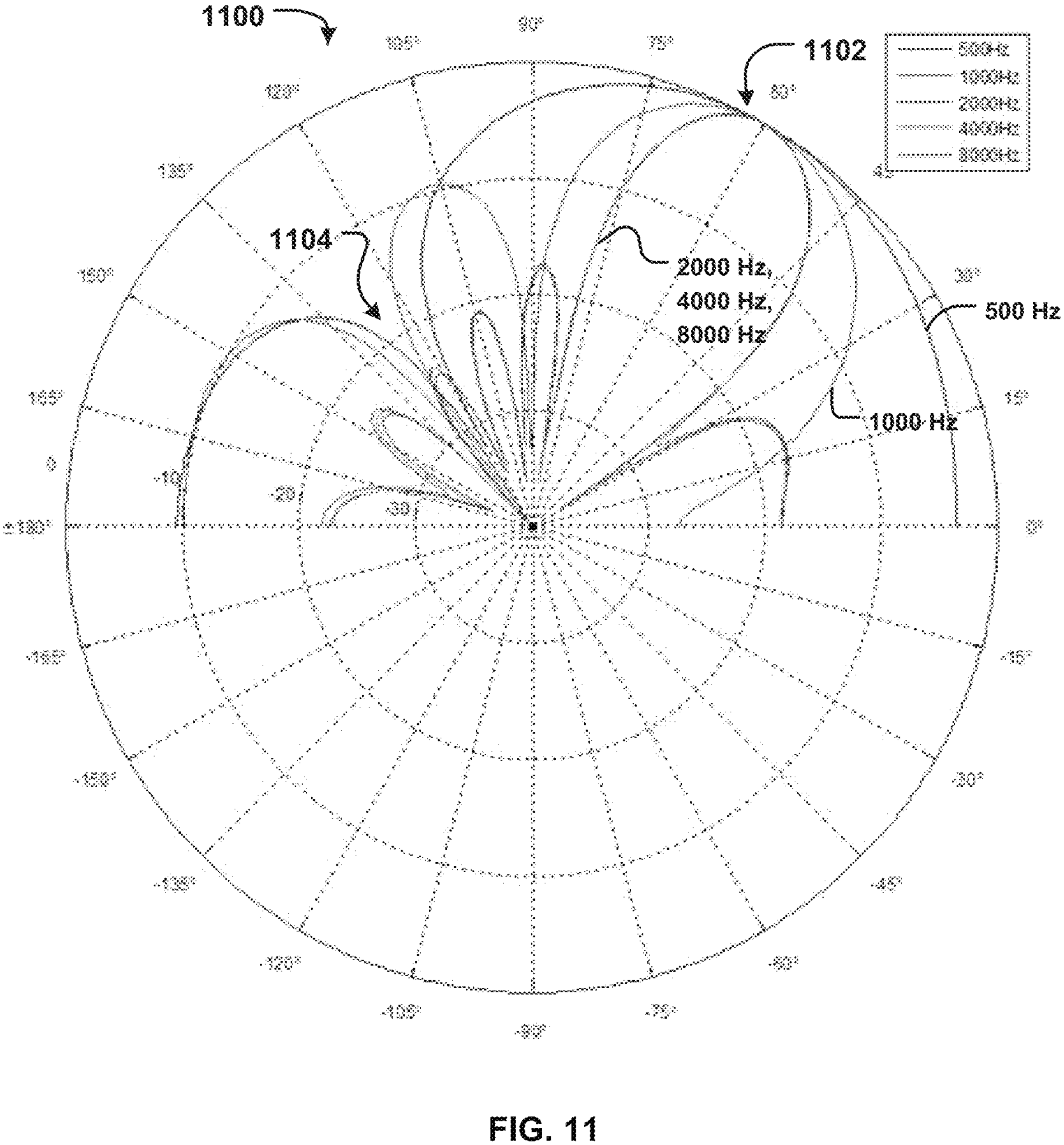
FIG. 11 is a polar plot showing select polar responses of the array microphone of FIG. 9 in accordance with certain embodiments.

In embodiments, in order to accommodate the possibility of several human speakers speaking simultaneously (e.g., in a boardroom environment), the microphone array 1034 can be configured to simultaneously form up to eight lobes at any angle around the microphone array 1034, for example, to emulate up to eight seated positions at a table. Due to its microphone configuration (e.g., the microphone configuration 900), the microphone array 1034 can form relatively narrow lobes (e.g., as shown in FIG. 11) to pick up less of the unwanted audio signals (e.g., noise) in an environment. The lobes can be steerable so as to provide audio pick-up coverage of human speakers positioned at any point 360 degrees around the array 1034. For example, the audio component 1036 may be configured (e.g., using computer programming instructions) to allow the lobes to be steered or adjusted to any point in a three-dimensional space covering azimuth, elevation, and distance or radius. In embodiments, the beam pattern of the microphone array 1034 can be electronically steered without physically moving the array 1034.

Further, the audio mixer may be configured to simultaneously provide up to eight individually-routed outputs or channels (not shown), each output corresponding to a respective one of the eight lobes of the microphone array 1034 and being generated by combining the inputs received from all microphones in the microphone array 1034. The audio mixer may also provide a ninth auto-mixed output to capture all other audio signals. As will be appreciated, the microphone array 1034 can be configured to have any number of lobes.

According to embodiments, the lobes of the microphone array 1034 can be configured to have an adjustable beamwidth that allows the audio component 1036 to effectively track, and capture audio from, human speakers as they move within the environment. In some cases, the microphone array system 1030 and/or the control device 1032 may include a user control (not shown) that allows manual beamwidth adjustment. For example, the user control may be a knob, slider, or other manual control that can be adjusted between three settings: normal beamwidth, wide beamwidth, and narrow beamwidth. In other cases, the beamwidth control can be configured using software running on the audio component 1036 and/or the control device 1032.

In environments where multiple microphone array systems 1030 are included, for example, to cover a very large conference room, the audio system 1000 may include an audio mixer that receives the outputs from the audio components 1036 included in each microphone array system 1030 and outputs a mixed output based on the received audio signals.

The audio component 1036 may also include an audio amplifier/recorder (not shown) that is in wired or wireless communication with the audio mixer. The audio amplifier/recorder may be a component that receives the mixed audio signals from the audio mixer and amplifies the mixed audio signals for output to a loudspeaker, headphones, live radio or TV feeds, etc., and/or records the received signals onto a medium, such as flash memory, hard drives, solid state drives, tapes, optical media, etc. For example, the audio amplifier/recorder may disseminate the sound to an audience through loudspeakers located in the environment 600, or to a remote environment via a wired or wireless connection.

The connections between the components shown in FIG. 10 are intended to depict the potential flow of control signals, audio signals, and/or other signals over wired and/or wireless communication links. Such signals may be in digital and/or analog formats.

In embodiments, the microphone array 1034 includes a plurality of MEMS microphones (e.g., the microphones 906) arranged in a self-similar or repeating configuration comprising concentric, nested rings of microphones (e.g., the rings 910-922) surrounding a central microphone (e.g., the microphone 902). MEMS microphones can be very low cost and very small sized, which allows a large number of microphones to be placed in close proximity in a single microphone array. For example, in embodiments, the microphone array 1034 includes between 113 and 120 microphones and has a diameter of less than two feet (e.g., to fit in place of a two feet by two feet ceiling tile). Further, by using MEMS microphones in the microphone array 1034, the audio component 1036 may require less programming and other software-based configuration. More specifically, because MEMS microphones produce audio signals in a digital format, the audio component 1036 need not include analog-to-digital conversion/modulation technologies, which reduces the amount of processing required to mix the audio signals captured by the microphones. In addition, the microphone array 1034 may be inherently more capable of rejecting vibrational noise due to the fact that MEMS microphones are good pressure transducers but poor mechanical transducers, and have good radio frequency immunity compared to other microphone technologies.

FIG. 11 is a diagram of an example microphone polar pattern 1100 in accordance with embodiments. The polar pattern 1100 represents the directionality of a given microphone array (e.g., the microphone array 1034/104 or a microphone array having the microphone configuration 900), or more specifically, indicates how sensitive the microphone array is to sounds arriving at different angles about a central axis of the microphone array. In particular, the polar pattern 1100 shows polar responses of the microphone array at each of frequencies 500 Hz, 1000 Hz, 2000 Hz, 4000 Hz, and 8000 Hz, with the microphone array being configured to form a lobe 1102, or a directional beam, at each of these frequencies and the lobe 1102 being steered to an elevation of 60 degrees relative to the plane of the array. As will be appreciated, while the polar plot 1100 shows the polar responses of a single lobe 1102 at selected frequencies, the microphone array is capable of creating multiple simultaneous lobes in multiple directions, each with equivalent, or at least substantially similar, polar response.

As shown by the polar pattern 1100, at the 1000 Hz frequency, side lobes 1104 are formed at 10 decibels (dB) below the main lobe 1102. Further, as shown in FIG. 11, the low frequency response at 500 Hz has a large beamwidth, representing lower directivity, while the higher frequency responses at 1000 Hz, 2000 Hz, 4000 Hz, and 8000 Hz each have a narrow beamwidth, representing high directivity. Thus, in embodiments, the microphone array can provide a high overall directivity index (e.g., 19 dB) across the voice frequency range with a high level of side lobe rejection and an optimal main-to-side-lobe ratio (e.g., 10 dB) over a prescribed steering angle range.

Figure 12:
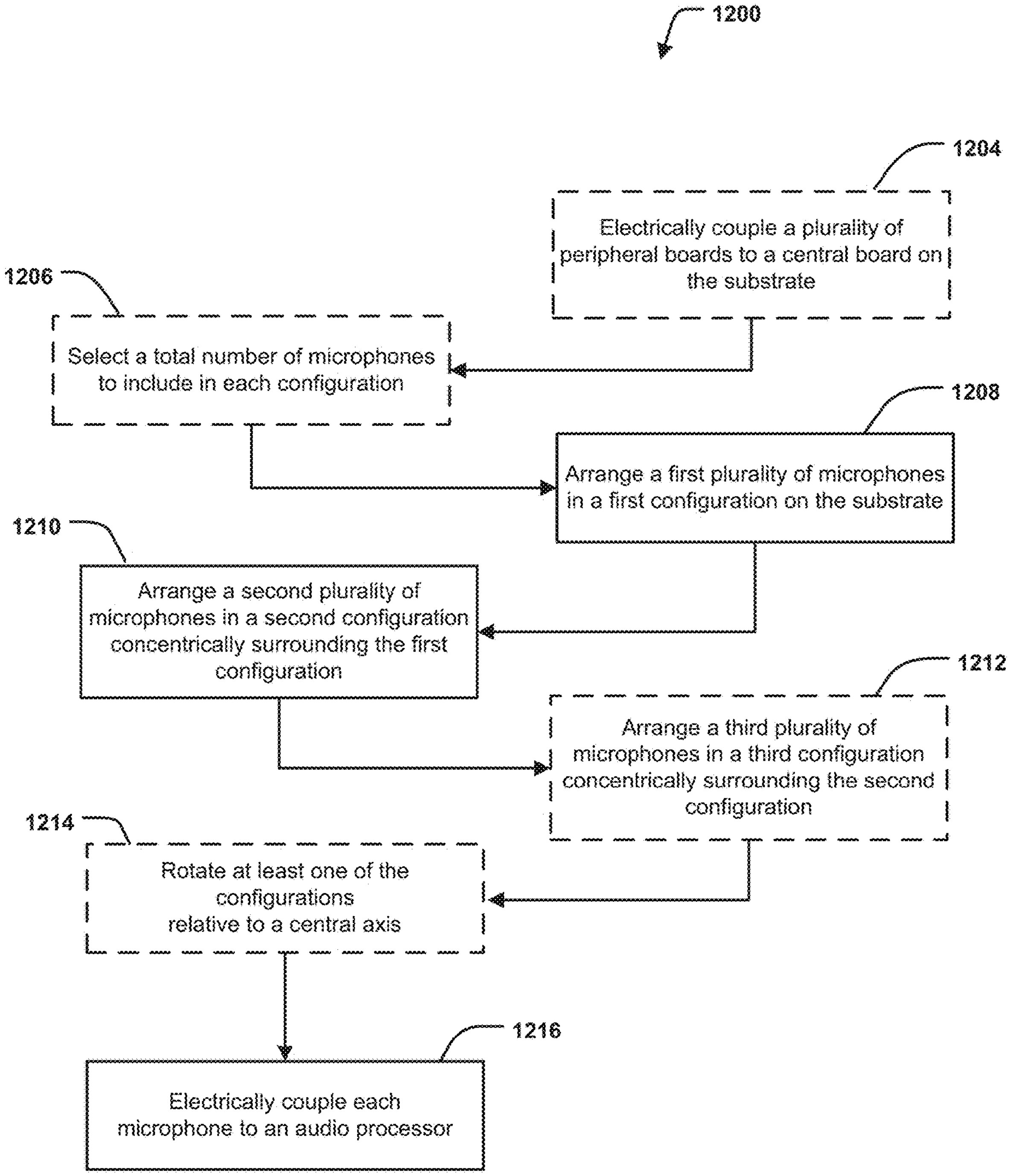
FIG. 12 is a flow diagram illustrating an example process for assembling an array microphone in accordance with certain embodiments.

FIG. 12 illustrates an example method 1200 of assembling an array microphone in accordance with embodiments. The array microphone may be substantially similar to the array microphone 104 shown in FIG. 5 and/or may include a plurality of microphones arranged in a configuration that is substantially similar to the microphone configuration 900 shown in FIG. 9. The array microphone may be arranged on a substrate, such as, for example, a printed circuit board, a carbon-fiber board, or any other suitable substrate. In some embodiments, the substrate includes a central board (e.g., the central PCB 107*a*) and a plurality of peripheral or satellite boards (e.g., the peripheral PCBs 107*b*). In such cases, the method 1200 can include step 1204, where the peripheral boards are electrically coupled to the central board, for example, using board-to-board connectors (e.g., connectors 130).

In some embodiments, the method 1200 includes, at step 1206, selecting a total number of microphones (e.g., the microphones 106*b*/906) to include in each configuration that will be placed on the substrate. Where the configuration includes a number of concentric rings, the number of microphones in each ring may be selected based on a desired frequency range of the array, a frequency band assigned to the ring, a desired microphone density for the array, as well as other considerations, as discussed herein. In one embodiment, the total number may be selected from a group consisting of numbers that are a multiple of an integer greater than one. For example, for the rings shown in FIGS. 5 and 9, the integer is seven, and each ring includes 7, 14, or 21 microphones. Other patterns or arrangements may drive the selection of the total number of microphones for each configuration, as described herein.

As illustrated, the method 1200 includes, at step 1208, arranging a first plurality of microphones in a first configuration on the substrate. The method 1200 also includes, at step 1210, arranging a second plurality of microphones in a second configuration on the substrate, the second configuration concentrically surrounding the first configuration. In some embodiments, the method 1200 can additionally include, at step 1212, arranging a third plurality of microphones in a third configuration on the substrate, the third configuration concentrically surrounding the second configuration.

In embodiments, each of the first, second, and/or third configurations comprises a number of concentric rings positioned at different radial distances from a central point of the substrate to form a nested configuration. In some cases, the first configuration includes a different number of concentric rings than at least one of the second configuration and the third configuration. For example, in the illustrated embodiment of FIG. 9, the first configuration comprises at least the innermost ring 910, the second ring 912, and third ring 914, the second configuration comprises at least the fourth ring 916 and the fifth ring 918, and the third configuration comprises at least the sixth ring 920 and the outermost ring 922. In each of the configurations, arranging the microphones can include, for each concentric ring, arranging a subset of the microphones at predetermined intervals along a circumference of that ring. In some embodiments, the first configuration further includes the central point of the substrate, and at least one of the first plurality of microphones is positioned at the central point. Further, in some embodiments, at least one of the rings included in the second configuration may be positioned on the peripheral boards. Further, in some embodiments, the third configuration may be positioned entirely on the peripheral boards.

In some embodiments, the method 1200 can include, at step 1214, rotating at least one of the first, second, and third fourth configurations relative to a central axis (e.g., the central axis 930) of the array microphone so that the configurations are at least slightly rotationally offset from each other, to improve the overall directivity of the array microphone. The method 1200 can also include, at step 1216, electrically coupling each of the microphones to an audio processor for processing audio signals captured by the microphones.

In embodiments, the first, second, and/or third pluralities of microphones are configured to cover different preset frequency ranges, or in some cases, octaves within an overall operating range of the array microphone (for example and without limitation, 100 Hz to 10 KHz). According to embodiments, a diameter of each concentric ring can be defined by a lowest operating frequency assigned to the microphones forming the ring. In some cases, the concentric rings included in the first, second, and/or third configurations are harmonically nested. In a preferred embodiment, the microphone array includes a plurality of MEMS microphones.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A microphone system, comprising:

an array microphone comprising a plurality of microphones, the array microphone configured to simultaneously form a plurality of lobes at various angles to capture a plurality of audio sources; and an audio processor electrically coupled to the array microphone, the audio processor configured to process audio signals captured by the plurality of microphones, wherein each of the plurality of lobes is steerable towards any point around the array microphone, wherein the audio processor is further configured to generate multiple audio outputs based on the audio signals captured by the plurality of microphones, each audio output corresponding to a respective one of the lobes.

2. The microphone system of claim 1, wherein the audio processor is further configured to steer at least one of the plurality of lobes towards a desired location.

3. The microphone system of claim 1, wherein the audio processor is further configured to adjust a beamwidth of a select one of the plurality of lobes.

4. The microphone system of claim 3, wherein the beamwidth is adjustable between a normal setting, a wide setting, and a narrow setting.

5. The microphone system of claim 1, wherein the audio processor is further configured to simultaneously provide each of the multiple audio outputs as an individually-routed channel.

6. The microphone system of claim 1, wherein the audio processor is further configured to provide an auto-mixed output based on the audio signals captured by the plurality of microphones.

7. The microphone system of claim 1, wherein the audio processor is further configured to perform digital signal processing including at least one of gain control and audio mixing.

8. The microphone system of claim 1, wherein the plurality of microphones are micro-electrical mechanical system (MEMS) microphones.

9. A method using an audio processor electrically coupled to an array microphone comprising a plurality of microphones, the method comprising:

simultaneously forming a plurality of lobes at various angles to capture a plurality of audio sources using the array microphone;

processing audio signals captured by the plurality of microphones; and generating mulitple audio outputs based on the audio signals captured by the plurality of microphones, each audio output corresponding to a respective one of the lobes, wherein each of the plurality of lobes is steerable towards any point around the array microphone.

10. The method of claim 9, further comprising: steering at least one of the plurality of lobes towards a desired location.

11. The method of claim 9, further comprising: adjusting a beamwidth of a select one of the plurality of lobes.

12. The method of claim 11, wherein the adjusting comprises adjusting the beamwidth between a normal setting, a wide setting, and a narrow setting.

13. The method of claim 9, further comprising: simultaneously providing each of the multiple audio outputs as an individually-routed channel.

14. The method of claim 9, further comprising: providing an auto-mixed output based on the audio signals captured by the plurality of microphones.

15. The method of claim 9, further comprising: performing digital signal processing including at least one of gain control and audio mixing.

16. The method of claim 9, wherein the plurality of microphones are micro-electrical mechanical system (MEMS) microphones.

17. A non-transitory computer-readable storage medium comprising instructions that, when executed by at least one processor, cause the at least one processor to perform:

process audio signals captured by an array microphone electrically coupled to the at least one processor, the array microphone comprising a plurality of microphones simultaneously forming a plurality of lobes at various angles to capture a plurality of audio sources; and generate multiple audio outputs based on the audio signals captured by the plurality of microphones, each audio output corresponding to a respective one of the lobes, wherein each of the plurality of lobes is steerable towards any point around the array microphone.

18. The non-transitory computer-readable storage medium of claim 17, further comprising instructions that cause the at least one processor to steer at least one of the plurality of lobes towards a desired location.

* * * * *